US009221443B2

(12) United States Patent
Ganzel

(10) Patent No.: US 9,221,443 B2
(45) Date of Patent: Dec. 29, 2015

(54) SLIP CONTROL BOOST BRAKING SYSTEM

(75) Inventor: Blaise Ganzel, Ann Arbor, MI (US)

(73) Assignee: Kelsey-Hayes Company, Livonia, MI (US)

(*) Notice: Subject to any disclaimer, the term of this patent is extended or adjusted under 35 U.S.C. 154(b) by 1028 days.

(21) Appl. No.: 11/988,129

(22) PCT Filed: Jun. 29, 2006

(86) PCT No.: PCT/US2006/025510
§ 371 (c)(1),
(2), (4) Date: Nov. 25, 2008

(87) PCT Pub. No.: WO2007/005571
PCT Pub. Date: Jan. 11, 2007

(65) Prior Publication Data
US 2009/0077963 A1     Mar. 26, 2009

Related U.S. Application Data

(60) Provisional application No. 60/695,631, filed on Jun. 30, 2005, provisional application No. 60/730,966, filed on Oct. 28, 2005.

(51) Int. Cl.
*B60T 8/171* (2006.01)
*B60T 8/40* (2006.01)
(Continued)

(52) U.S. Cl.
CPC ............... *B60T 8/4077* (2013.01); *B60T 8/34* (2013.01); *B60T 8/38* (2013.01); *B60T 8/4072* (2013.01); *B60T 11/203* (2013.01)

(58) Field of Classification Search
CPC ......... B60T 8/441; B60T 8/446; B60T 8/447; B60T 8/4004; B60T 13/58; B60T 13/66; B60T 13/143; B60T 13/145; B60T 13/146; B60T 13/656; B60T 13/683; B60T 13/686; B60T 11/206; B60T 17/228

USPC .................. 303/114.1, 154, 14, 114.2, 3, 15, 303/113.3–113.4; 60/562, 580, 581
IPC ........................................................ B60T 8/171
See application file for complete search history.

(56) References Cited

U.S. PATENT DOCUMENTS 3,033,324 A    5/1962    Lepelletier
3,040,534 A    6/1962    Hager
(Continued)

FOREIGN PATENT DOCUMENTS

DE    19546647    6/1997
DE    19651153    6/1998
(Continued)

OTHER PUBLICATIONS

Chinese Office Action, Application No. 200680030224.0 dated Apr. 13, 2011.
(Continued)

*Primary Examiner* — Anna Momper
*Assistant Examiner* — San Aung
(74) *Attorney, Agent, or Firm* — MacMillan, Sobanski & Todd, LLC

(57) ABSTRACT

A master cylinder includes a housing and a first secondary piston disposed in the housing. The first secondary piston cooperates with the housing to define a first secondary chamber which changes volume as the first secondary piston moves in the housing. A second secondary piston is disposed in the housing and cooperates with the housing to define a second secondary chamber which changes volume as the second secondary piston moves in the housing. A stepped primary piston is disposed in the housing. The primary piston cooperates with the housing to define a primary chamber which changes volume as the primary piston moves in the housing. The primary piston defines an abutment surface which can be driven into abutment with the first secondary piston and the second secondary piston to move the first secondary piston and the second secondary piston. A primary piston spring maintains a restorative force on the primary piston when actuated.

1 Claim, 12 Drawing Sheets

(51) Int. Cl.
*B60T 8/34* (2006.01)
*B60T 8/38* (2006.01)
*B60T 11/20* (2006.01)

(56) References Cited

U.S. PATENT DOCUMENTS

| | | | |
|---|---|---|---|
| 3,870,377 A * | 3/1975 | Belart | B60T 8/4004 188/181 A |
| 3,979,153 A * | 9/1976 | Ingram | B60T 8/441 188/181 R |
| 4,405,181 A * | 9/1983 | Resch | B60T 8/441 188/DIG. 1 |
| 4,489,989 A * | 12/1984 | Belart | B60T 8/441 303/114.2 |
| 4,604,870 A * | 8/1986 | Bach | B60T 13/145 60/551 |
| 4,629,258 A * | 12/1986 | Resch | B60T 8/445 303/113.4 |
| 4,657,315 A | 4/1987 | Belart | |
| 4,824,185 A * | 4/1989 | Leiber | B60T 8/175 303/113.5 |
| 4,832,416 A | 5/1989 | Kaes | |
| 5,070,699 A | 12/1991 | Leiber | |
| 5,273,348 A | 12/1993 | Yagi | |
| 5,445,444 A | 8/1995 | Rump | |
| 5,448,888 A | 9/1995 | Castel | |
| 5,941,608 A | 8/1999 | Campau | |
| 5,988,768 A | 11/1999 | Schaefer | |
| 6,086,167 A | 7/2000 | Heckmann | |
| 6,161,904 A | 12/2000 | Schmidt et al. | |
| 6,183,050 B1 * | 2/2001 | Ganzel | B60T 7/042 188/358 |
| 6,206,484 B1 * | 3/2001 | Ganzel | B60T 8/268 188/358 |
| 6,216,457 B1 | 4/2001 | Lubbers | |
| 6,808,238 B2 | 10/2004 | Drott et al. | |
| 6,851,764 B2 * | 2/2005 | Giers | B60T 8/36 303/115.2 |
| 2003/0222497 A1 * | 12/2003 | Fey | B60T 7/06 303/113.1 |

FOREIGN PATENT DOCUMENTS

| | | |
|---|---|---|
| DE | 19654427 | 6/1998 |
| DE | 19734956 | 2/1999 |
| DE | 19807369 | 8/1999 |
| DE | 19826346 | 10/1999 |
| DE | 10159788 | 6/2003 |
| GB | 2340194 | 2/2000 |
| JP | 01218874 | 1/1989 |
| JP | 2004051078 | 2/2004 |
| WO | 0172567 A1 | 10/2001 |

OTHER PUBLICATIONS

Japanese Office Action, Application No. 2008-519,593.
Office Action to 06785926.4-2423 /1907251 PCT/US2006025510 dated Sep. 23, 2010.

* cited by examiner

SLIP CONTROL BOOST BRAKING SYSTEM

CROSS REFERENCE TO RELATED APLLICATIONS

This application is the U.S. national phase of International Application No. PCT/US06/025510, filed Jun. 29, 2006, which claims priority to U.S. Provisional Application No.60/695,631, filed Jun. 30,2005 and U.S. Provisional Application No. 60/730,966, filed Oct. 28, 2005.

BACKGROUND OF THE INVENTION

Description of Related Art

Electric-hydraulic braking systems typically include a manually powered master cylinder coupled to vehicle brakes on the vehicle wheels through isolation valves. When a driver of the vehicle applies a pressure to the brake pedal, hydraulic pressurized fluid is provided to a pedal simulator to simulate the pressure exerted against a driver's foot in a conventional braking system. Pressure transducers measure the applied force of the pressure exerted on the pedal by the driver's input and produces a signal representative of the desired braking effort by the driver. The signal indicative of the applied pressure is provided to an electronic control unit which controls an operation of one or more motor operated pumps to deliver a flow of pressurized hydraulic braking fluid to the vehicle brake actuators. If the electric-hydraulic braking system is working in cooperation with secondary braking subsystems, such as anti-lock braking systems, operation of such secondary braking systems may cause pressure differentials and flow rate issues when urgently actuated.

Furthermore, during an electrical or hydraulic failure, electronic hydraulic braking systems include of safeguard in the event a hydraulic failure or electrical failure occurs where a manual push through operation may be utilized. This typically includes de-energizing one or more isolation valves so that manual braking (via a backup circuit) may be performed directly from master cylinder to the vehicle brake actuators without the assistance of the motor operated pumps. However, some systems (such as that shown in U.S. Pat. No. 6,733,090, assigned to Robert Bosch GmbH) rely on one or more isolation valves to allow pressurized brake fluid from the master cylinder to actuate one or more vehicle brake actuators, respectively. Some braking system include a single circuit for applying electro-hydraulic braking fluid to one set of wheels associated with a single vehicle axle (i.e., either the front or rear set of wheels), while the other set of wheels would have brakes that are strictly hydraulically actuated. Other braking systems include two electro-hydraulic brake circuits (i.e., a first circuit for a first set of wheels and a second circuit for second set of wheels). However, such systems typically rely on an assumption that the isolation valves which allow the flow of hydraulic brake fluid from the master cylinder to the vehicle brake actuators will de-energize open. Such systems are susceptible to having no manual "push through" if the isolation valves become inoperable in the closed position or if a hydraulic leak occurs.

Moreover, a multi-chamber and multi-piston master cylinder such as the master cylinder described in co-pending PCT application number PCT/US2005/016179 filed May 6, 2005, must optimized in size to accommodate packaging constraints within an engine compartment. In addition, if the electric-hydraulic braking module is packaged separately from the master cylinder, gas may become entrapped in the segregated braking module which must be purged. Entrapped gas is typically not able to be naturally bleed from the master cylinder to the braking module (and eventually to the reservoir) when the master cylinder is at a higher elevation than the braking module.

FIELD OF THE INVENTION

The present invention relates in general to a braking system for applying hydraulic braking pressure to vehicle brakes in a controlled manner.

More particularly, the present invention relates to a braking system for using an electro-hydraulic boost braking system with a multi-piston and multi-chamber master cylinder.

DETAILED DESCRIPTION OF PREFERRED EMBODIMENTS

Figure 1:
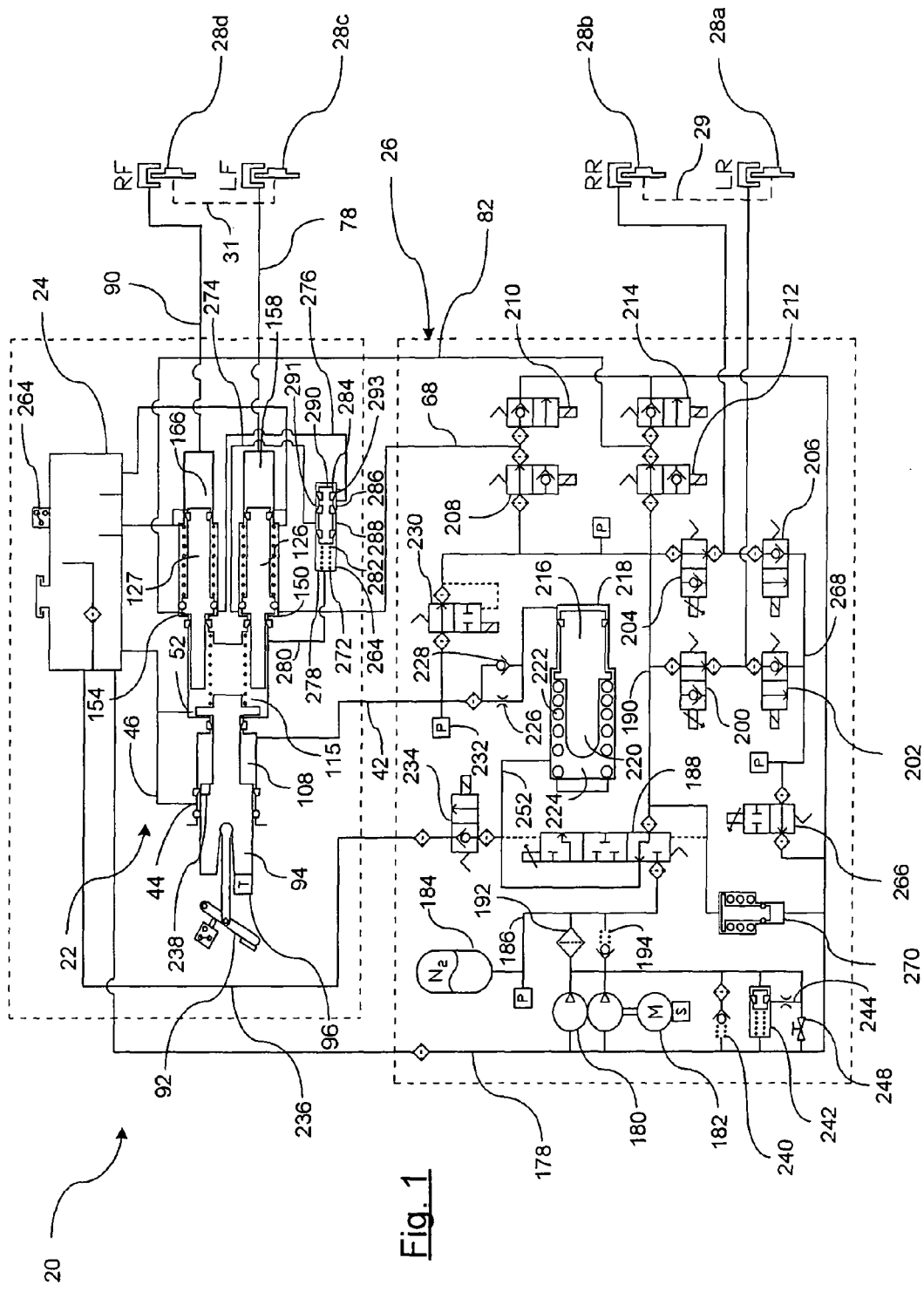
FIG. 1 is a schematic of a braking system according to a first preferred embodiment of the present invention.

There is shown in FIG. 1, a first embodiment of a vehicle brake system indicated generally at 20, in accordance with the invention for applying active hydraulic boost in a braking system. The brake system 20 may suitably be used on a ground vehicle such as an automotive vehicle having four wheels and a brake for each wheel. Furthermore, the brake system 20 can be provided with other braking functions such as anti-lock braking and other slip control features to effectively brake the vehicle while simulating a normal response and pedal feel to the operator of the vehicle.

The brake system 20 includes a master cylinder 22 in fluid communication with a reservoir 24 that cooperatively acts with a brake module 26 for actuating a first vehicle brake 28a and a second vehicle brake 28b on a rear vehicle axle 29 and for actuating a third vehicle brake 28c and a fourth vehicle brake 28d of a front vehicle axle 31 for braking a vehicle. Each of the vehicle brakes 28a-d includes a conventional brake operated by the application of pressurized brake fluid. The brake may be, for example, a brake caliper mounted on the vehicle to engage a frictional element (such as a brake disc) that rotates with a vehicle wheel to effect braking of the associated vehicle wheel.

Figure 2:
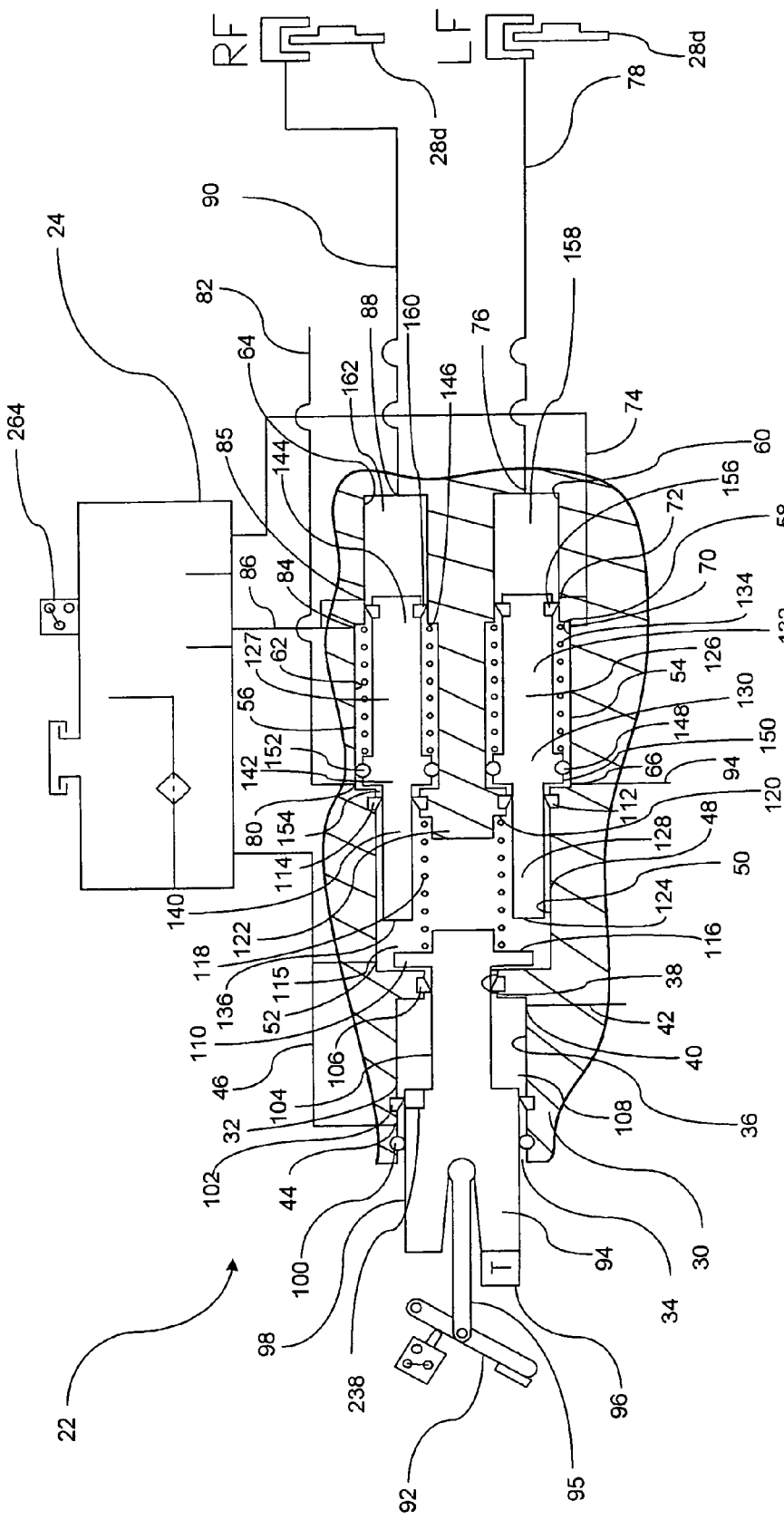
FIG. 2 is an enlarged schematic view of a master cylinder according to a first preferred embodiment of the present invention.
Figure 3:
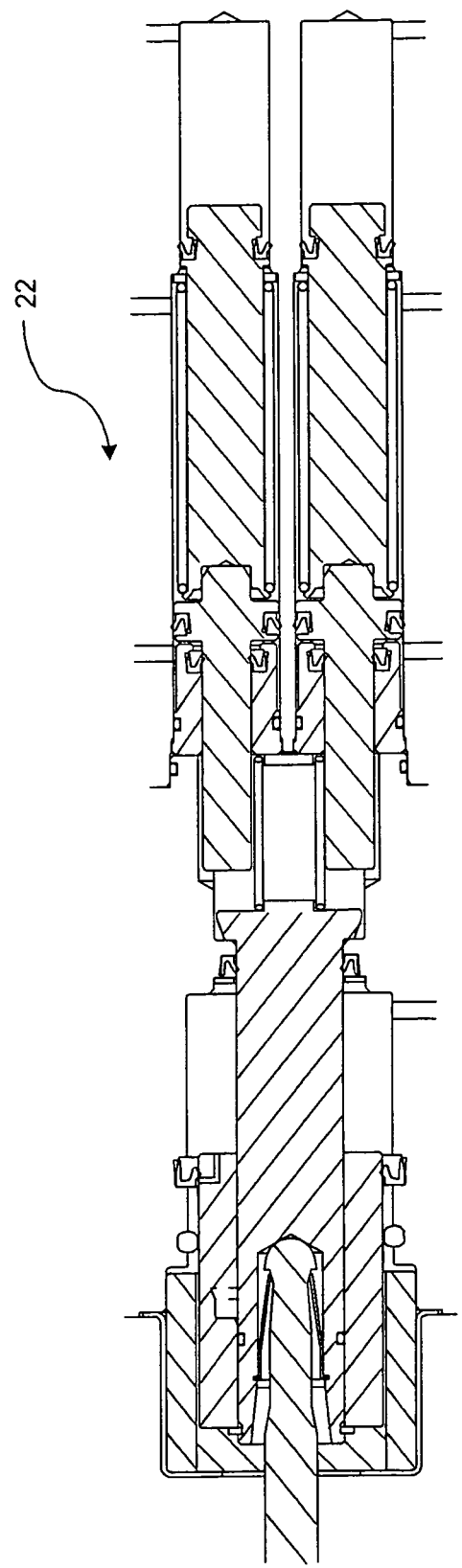
FIG. 3 is a cross section view (plan view) of the master cylinder according to a first preferred embodiment of the present invention.

As may also be seen in FIG. 2 and FIG. 3, the master cylinder 22 includes a master cylinder housing 30. Although the master cylinder housing 30 is described below as individual housing portions, the master cylinder housing 30 may be formed as two or more separately formed housing portions coupled together or may be formed as a single housing. The master cylinder 22 includes a primary housing portion 32 formed at a first end 34 of the master cylinder housing 30. The first end 34 includes an open ended first cylindrical bore 36 of a first diameter. The first cylindrical bore 36 steps to a second cylindrical bore 38 within the primary housing portion 32 having a diameter smaller than that of the first cylindrical bore 36. The first cylindrical bore 36 and the second cylindrical bore 38 are axially aligned with one another. The primary housing portion 32 includes a first port 40 that is coupled to a fluid circuit 42 and a second port 44 that is coupled to a fluid circuit 46.

The primary housing portion 32 is integrally formed with an intermediate housing portion 48 that includes a third cylindrical bore 50. The second cylindrical bore 38 steps to the third cylindrical bore 50 which preferably has a diameter larger than the diameter of the second cylindrical bore 38. The second cylindrical bore 38 is axially aligned with the third cylindrical bore 50. The intermediate housing portion 48 includes a third port 52 coupled to the fluid circuit 46 that is in fluid communication with the reservoir 24.

The intermediate housing portion 48 is integrally formed with a first secondary housing portion 54 and a second secondary housing portion 56. The first secondary housing portion 54 includes a fourth cylindrical bore 58. The third cylindrical bore 50 of the intermediate housing portion 48 steps up to the fourth cylindrical bore 58 of the first secondary housing portion 54. The fourth cylindrical bore 58 steps down to a fifth cylindrical bore 60.

The second secondary housing portion 56 includes a sixth cylindrical bore 62. The third cylindrical bore 50 of the intermediate housing portion 48 steps up to the sixth cylindrical bore 62 of the second secondary housing portion 56. The sixth cylindrical bore 62 steps down to a seventh cylindrical bore 64.

The fourth cylindrical bore 58 and the fifth cylindrical bore 60 are axially aligned with one another, as are the sixth cylindrical bore 62 and the seventh cylindrical bore 64. Preferably, both the fourth cylindrical bore 58 and the sixth cylindrical bore 60 are parallel to one another and have equal diameters. In addition, preferably the fifth cylindrical bore 60 and the seventh cylindrical bore 64 are parallel to one another and have equal diameters.

The first secondary housing portion 54 includes a fourth port 66 coupled to a fluid circuit 68, a fifth port 70 and a sixth port 72 which are both coupled to a fluid circuit 74, and a seventh port 76 coupled to a second brake fluid circuit 78.

The second secondary housing portion 56 includes an eighth port 80 coupled to a fluid circuit 82, a ninth port 84 and a tenth port 85 which are both coupled to a fluid circuit 86, and an eleventh port 88 is coupled to a third brake fluid circuit 90.

A brake pedal 92 is coupled to a first end of a primary piston 94 of the master cylinder 22 via an input rod 95. A travel sensor 96 produces a signal that is indicative of the length of travel of the brake pedal 92.

The primary piston 94 includes a first cylindrical portion 98 having an outer diameter slightly smaller than the inner diameter of the first cylindrical bore 36. The first cylindrical portion 98 of the primary piston 94 is slideable within the first cylindrical bore 36. A primary seal 100 is embedded on an inner surface of the first cylindrical bore 36 for preventing brake fluid from passing between the first cylindrical portion 98 and inner surface of the first cylindrical bore 36 of the primary housing portion 32 in either direction. In addition, a first seal 102 is embedded in the inner surface wall of the first cylindrical bore 36 for preventing fluid flow in the direction of the primary seal 100.

The first cylindrical portion 98 steps to a second cylindrical portion 104. The outer diameter of the second cylindrical portion 104 is substantially smaller than the first cylindrical portion 98. The second cylindrical portion 104 is slidable within both the first cylindrical bore 36 and the second cylindrical bore 38. The second cylindrical bore 38 is provided with a second seal 106. The first seal 102 and the second seal 106 seal the region between the first seal 102 and the second seal 106 to define a primary chamber 108. The second seal 106 provides a unidirectional seal for preventing brake fluid from exiting the primary chamber 108.

The second cylindrical portion 104 of the primary piston 94 steps up to a third cylindrical portion 110. The outer diameter of the third cylindrical portion 110 is larger than the outer diameter of the second cylindrical portion 104. The third cylindrical portion 110 is slidable within the third cylindrical bore 50. The third cylindrical bore 50 includes a third seal 112 and a fourth seal 114. The seals 106, 112, and 114 cooperate with the master cylinder housing 30, the first secondary housing portion 54, and the second secondary housing portion 56 the primary piston 94, an abutment member 122, a first secondary piston 126, and a second secondary piston 127 to seal and define a first intermediate chamber 115.

The primary piston 94 includes an abutment surface 116. A primary piston spring 118 is disposed in a preloaded state between the abutment surface 116 of the primary piston 94 and an abutment surface 120 of the abutment member 122. The abutment surfaces 116 and 122 may include stepped portions for retaining the primary piston spring 118 on each of the respective abutment surfaces 116 and 120.

A portion of the abutment surface 116 of the primary piston 94 is aligned with a first end 124 of the first secondary piston 126. The first secondary piston 126 includes a first cylindrical portion 128 that steps up to a second cylindrical portion 130. The diameter of the second cylindrical portion 130 is larger than the diameter of the first cylindrical portion 128. The second cylindrical portion 130 steps down to a third cylindrical portion 132 of the first secondary piston 126. The diameter of the third cylindrical portion 132 is smaller than the second cylindrical portion 130. A first secondary piston spring 134 is disposed about the circumference of the third cylindrical portion 132. The ends of the first secondary piston spring 134 are disposed between the stepped surface that transitions between the second cylindrical portion 130 and the third cylindrical portion 132 and the stepped portion that transitions between the fourth cylindrical bore 58 and the fifth cylindrical bore 60.

The abutment surface 116 of the primary piston 94 is aligned with a first end 136 of the second secondary piston 127. The second secondary piston 127 includes a first cylindrical portion 140 that steps up to a second cylindrical portion 142. A diameter of the second cylindrical portion 142 is larger than the diameter of the first cylindrical portion 140. The second cylindrical portion 142 steps down to a third cylindrical portion 144 of the second secondary piston 127 that has a diameter smaller than the second cylindrical portion 142. A second secondary piston spring 146 is disposed about the circumference of the third cylindrical portion 144. The ends of the first secondary piston spring 146 are disposed between the stepped surface that transitions between the second cylindrical portion 142 and the third cylindrical portion 144 and a stepped portion transitioning between the sixth cylindrical bore 62 and the seventh cylindrical bore 64.

Positioning the secondary piston springs 134 and 146 about the circumference of the first secondary piston 126 and the second secondary piston 127, respectively, prevents each of the springs from buckling when compressed. In addition, the overall length of the master cylinder 22 may be reduced as in contrast to packaging the respective secondary piston springs forward of the each respective secondary piston.

A fifth seal 148 is disposed about the outer surface of the second cylindrical portion 130 of the first secondary piston 126 and is moveable with the first secondary piston 126. The fifth seal 148 and the third seal 112 seal a second intermediate chamber 150 therebetween. Similarly, a sixth seal 152 is disposed about the outer surface of the second cylindrical portion 142 of the second secondary piston 127 and is moveable with the second secondary piston 127. The sixth seal 152 and the fourth seal 114 seal a third intermediate chamber 154 therebetween.

A seventh seal 156 is disposed about an outer surface of the third cylindrical portion 132 of the first secondary piston 126. A first secondary chamber 158 is formed between the region enclosed by the seventh seal 156, the end of the first secondary piston 126, and the inner walls of the fifth cylindrical bore 60.

An eighth seal 160 is disposed about the outer surface of the third cylindrical portion 144 of the second secondary piston 127. A second secondary chamber 162 is formed between the region enclosed by the eighth seal 160, the end of the second secondary piston 127, and the inner walls of the seventh cylindrical bore 64.

The stepped secondary pistons 126 and 127 (more specifically, the third cylindrical portions 132 and 144 of the first secondary piston 126 and the second secondary piston 127, respectively) compensates for rear bias during normal boost braking operations and lessens dynamic rear proportioning when no electric power is present. The third cylindrical portions 132 and 144 have smaller diameters than the respective second cylindrical portions 136 and 142 of each respective secondary piston. This allows seventh seal 156 and eighth seal 160 disposed about the first and second secondary pistons 126 and 127, respectively, to be smaller. As the brake pedal 92 is released, the respective secondary pistons 126 and 127 are dragged out their respective bores 60 and 64, respectively, since the surface area of each respective piston 126, 127 in contact with the respective seals 156 and 160 have been reduced. As a result, less friction is generated as each secondary piston 126 and 127 slides in and out of their respective cylindrical bores 60 and 64.

Similarly, the reduced diameter of the second cylindrical portion 104 of the primary piston 94 generates less friction with the contacting surface of the second seal 106. As discussed earlier, the primary piston 94 transitions out of the second cylindrical bore 38 of the primary housing portion 32 easier than if the second cylindrical bore 38 were of the same diameter as the first cylindrical bore 36. As a result, less friction is generated as the primary piston 94 slides in and out of the second cylindrical bore 38 due to a decrease in the surface contact between the inner wall of the second cylindrical bore 38 and the second seal 106.

A portion of the first cylindrical portion 128 of the first secondary piston 126 is slideable within both the intermediate housing portion 48 and the first secondary housing portion 54. The second cylindrical portion 130 is slideable within the fourth cylindrical bore 58 of the first secondary housing portion 54. A portion of the third cylindrical portion 132 is slideable within both the fourth cylindrical bore 58 and the fifth cylindrical bore 60 of the first secondary housing portion 54. The spring 134 disposed about the first secondary piston 126 within the first secondary housing portion 54 is in a preloaded state for biasing the first secondary piston 126.

A portion of the first cylindrical portion 140 of the second secondary piston 127 is slideable within both the intermediate housing portion 48 and the second secondary housing portion 56. The second cylindrical portion 142 is slideable within the sixth cylindrical bore 62 of the first secondary housing portion 56. A portion of the third cylindrical portion 144 is slideable within both the sixth cylindrical bore 62 and the seventh cylindrical bore 64 of the first secondary housing portion 56. The spring 146 disposed about the second secondary piston 127 within the second secondary housing portion 56 is in a preloaded state for biasing the first secondary piston 126.

Referring again to FIG. 1, a primary circuit 178 provides hydraulic braking fluid from a reservoir 24 to a pump 180 driven by an electric motor 182. In the preferred embodiment, the motor 182 is a flux switching brushless motor that self monitors its torque output. A high pressure accumulator (HPA) 184 is in fluid communication with the pump 180 via a fluid circuit 186. The HPA 184 shown is a piston style accumulator with sliding seal and a pre-charge of nitrogen acting as a spring. A diaphragm-type HPA with a diaphragm made of metal, rubber, plastic, or other elastomer can also be used. Other types of suitable gas may be used which have a compressible volume. The pre-charge of nitrogen contained in the HPA 184 biases the piston toward the fluid connection of the HPA 184. Of course, any suitable accumulator design may be used, and the HPA 184 need not be of the piston-type design depicted. For example, the HPA 184 may be a bladder or a diaphragm-driven accumulator. Additionally, instead of compressed gas, a spring or other compressible, resilient component (such as an elastomer) may be acted against in the HPA 184. In accumulators acting against a sealed volume of gas, the accumulators are sized according to the actual gas volume when all the brake fluid is discharged. The available volume of brake fluid in a usable pressure range for a given accumulator, known as working volume, is affected by the amount of compressible gas available to discharge it from the accumulator. The working volume varies as the pressure and temperature of the compressible gas varies. Rate of charge and discharge also needs to be considered when sizing the accumulator.

In operation, pressurized brake fluid from the pump 180 is supplied to the HPA 184 in cooperation with an electrohydraulic pilot operated boost valve 188. The boost valve 188 is a variable flow valve that may maintain pressure in the fluid circuit 186 to allow pressurized brake fluid to flow from the discharge of the pump 180 to the HPA 184 for pressurizing the HPA 184 with pressurized brake fluid. The boost valve 188 further allows the flow of pressurized brake fluid via a first brake fluid circuit 190 for actuating the vehicle brakes 28a-d. A filter 192 is connected between the pump 180 and the HPA 184/boost valve 188 for filtering pressurized brake fluid provided to the HPA 184 or the boost valve 188 from the pump 180. If the filter 192 becomes blocked, a bypass valve 194 is connected in parallel with the filter 192 for allowing pressurized brake fluid to bypass the filter 192 and flow to the HPA 184 and the boost valve 188.

A first set of valves include an apply valve 200 and a dump valve 202 in fluid communication with the first brake fluid circuit 190 for cooperatively supplying brake fluid received from the boost valve 188 to the first brake 28a and for cooperatively relieving pressurized brake fluid from the first brake 28*a*. A second set of valves include an apply valve 204 and a dump valve 206 in fluid communication with the first brake fluid circuit 190 for cooperatively supplying pressurized brake fluid received from the boost valve 188 to the second brake 28*b* and for cooperatively relieving pressurized brake fluid from the second brake 28*b*.

A third set of valves include an apply valve 208 and a dump valve 210 in fluid communication with the first brake fluid circuit 190 and a fluid circuit 68 for cooperatively supplying pressurized brake fluid received from the boost valve 188 for actuating the third brake 28*c* and for cooperatively relieving pressurized brake fluid from the third brake 28*c*.

A fourth set of valves include an apply valve 212 and a dump valve 214 that are in fluid communication with the first brake fluid circuit 190 and the fluid circuit 68 for cooperatively supplying pressurized brake fluid received from the boost valve 188 for actuating the fourth brake and for cooperatively relieving pressurized brake fluid from the fourth brake 28*d*.

A pedal simulator 216 simulates the characteristics of a conventional boost system as felt by the driver at the brake pedal 92. The pedal simulator includes a first chamber 218 in fluid communication with the primary chamber 108 of the master cylinder 22 for receiving brake fluid from the primary chamber 108 during a brake apply operation. A pedal simulator piston 220 and a pedal simulator spring 222 are disposed between the first chamber 218 and a second chamber 224. The second chamber 224 is in fluid communication with the first brake fluid circuit 190 (via a fluid circuit 252) for providing a return passage of brake fluid from the first brake fluid circuit 190 via the boost valve 188 during a brake release operation.

A dampening orifice 226 is disposed between the primary chamber 108 and the pedal simulator 216. The dampening orifice 226 includes a narrowed cross-sectional passage that restricts the amount of hydraulic brake fluid that can flow through the dampening orifice 226 both to and from the pedal simulator 216. A check valve 228 is coupled in parallel to the dampening orifice 226 between the primary chamber 108 and the pedal simulator 216.

A normally open (N/O) base brake valve 230 is an electrically actuated valve that is ported normally open when in a de-energized position. The N/O base brake valve 230 is fluidically coupled between the fluid circuit 42 which is in fluid communication with the primary chamber 108 of the master cylinder 22 and the first brake fluid circuit 190. A pressure sensor 232 is coupled to the fluid circuit 42 for monitoring the fluid pressure within the fluid circuit 42. A normally closed (N/C) base brake valve 234 is in fluid communication and disposed between the pedal simulator 216 and the reservoir 24.

When braking is required, the boost valve 188 is energized to allow pressurized brake fluid provided by the HPA 184 and the pump 180 to flow through the first brake fluid circuit 190 to actuate the vehicle brakes 28*a*, 28*b*, 28*c*, and 28*d*. In the event of an electrical failure, the boost valve 188 will not remain active and will return to a de-energized position thereby applying no boost function from the HPA 184. Since the boost valve 188 is an electrically actuated boost valve, a manual push through operation can be used to brake the front vehicle brakes 28*c* and 28*d* and the rear vehicle brakes 28*a* and 28*b* in the event of an electrical failure. The motive force for manual push through operation for the rear vehicle brakes 28*a* and 28*b* is manually provided by the operator exerting a force on the brake pedal 92 to pressurize hydraulic fluid in the primary chamber 108 and force hydraulic brake fluid via the fluid circuit 42 through the N/O base brake valve 230. During hydraulic boost operation, the N/O base brake valve 230 is electrically ported closed to allow hydraulic fluid flow to the pedal simulator 216. During an electrical failure, the N/O base brake valve 230 is de-energized to the open position to allow hydraulic brake fluid to flow to the rear vehicle brakes 28*a* and 28*b*. When the N/O base brake valve 230 is in the open position, the hydraulic brake fluid is unrestricted while passing through the base brake valve 230. As a result, no additional pressure is required by the operator of the vehicle to force open the N/O base brake valve 230 (as opposed to a conventional fail-safe valve which could less preferably be utilized in place of the N/O base brake valve 230, and which may require additional force to overcome internal spring forces of such valves to open the ports for allowing hydraulic brake fluid to pass to the vehicle brakes).

When increased hydraulic boost is required for actuating the vehicle brakes 28*a*, 28*b*, 28*c*, and 28*d*, the N/O base brake valve 230 is energized to the closed position to allow increased hydraulic pressure to flow to the first brake fluid circuit 190 for actuating the vehicle brakes. During periods of high boost, when the pressure differential is much greater in the first brake fluid circuit 190 in comparison to the circuit 42, the N/O base brake valve 230 is hydraulically locked shut due to the large pressure differential. Under this condition, should the hydraulic boost pressure become too low and manual push through is required, the operator exerts a force on the brake pedal 92 to open both the electrically actuated closed N/O base brake valve 230 and overcome the residual boost pressure still present within the first brake fluid circuit 190. To minimize the force required to manual push through the N/O base brake valve 230, the N/O base brake valve 230 is de-energized. Though the N/O base brake valve 230 is de-energized, the N/O base brake valve 230 may remain closed so long as the pressure differential is large enough between the first brake fluid circuit 190 and the fluid circuit 42 to maintain the hydraulically locked condition. Should the boost pressure decrease when manual push through is required, the operator needs only to exert a brake pedal force sufficient to overcome the pressure differential (hydraulic lock condition) as opposed to exerting a greater brake pedal force sufficient to overcome the hydraulically locked condition and to open the energized closed N/O base brake valve 230. Furthermore, the N/O base brake valve 230 is disposed between the primary chamber 108 and the pedal simulator 216 upstream of the dampening orifice 226.

When the operator suddenly exerts a large braking force on the brake pedal 92, it is undetermined whether the driver is exerting the large braking force to momentarily brake the vehicle and then quickly release the brakes or if the driver intends to maintain the large braking force to bring the vehicle to a halt. Under both conditions, hydraulic boost from the pump 180 and the HPA 184 quickly builds pressure to actuate vehicle brakes 28*a*, *b*, *c*, and *d*. While the boost valve 188 is energized open to allow the pump 180 and the HPA 184 to increase pressure in the first brake fluid circuit 190 for vehicle brake actuation, the flow rate from the primary chamber 108 of the master cylinder 22 via the fluid circuit 42 may be larger than the boost pressure in the first brake fluid circuit 190. Under these conditions, the pressure differential between the fluid circuit 42 and the first brake fluid circuit 190 may force N/O base brake valve 230 open. To prevent N/O base brake valve 230 from opening under such conditions, N/O base brake valve 230 is fully energized closed to prevent momentary pressure increases within fluid the first brake fluid circuit 190 from opening the valve.

To minimize energy consumption of N/O base brake valve 230, N/O base brake valve 230 is current limited depending upon the hydraulic brake fluid flow rate. That is, when N/O base brake valve 230 is energized closed, under low flow rates, current supplied to the N/O base brake valve 230 may be decreased proportionally to the flow rate since only a low amount of energy is required to maintain the closed position. Alternatively, if high flow rates are expected within the respective fluid circuits, current supplied to the N/O base brake valve 230 may be increased proportionally since a higher amount of energy is required to overcome the increasing pressure on the N/O base brake valve 230 to maintain the closed position.

A travel sensor 96 is primarily used to determine drivers braking intent. Pedal travel may not provide accurate information regarding the drivers braking demands when a large braking force is applied. For example, when an initial force is applied to the brake pedal 92, the brake pedal 92 may travel a substantial distance, however, the increase in the M/C primary pressure may be minimal. Alternatively when a large force is applied to the brake pedal 92 and the force exerted on the brake pedal 92 is slowly decreased, the brake pedal travel may decrease by a small distance but the pedal force may decrease substantially. To better correlate the boost pressure and the pedal travel, the pressure sensor 232 is used to measure the pressure within the fluid circuit 42 to assist in verifying braking demands. For example, when the initial force is applied to the brake pedal 92, the travel sensor 96 is a more accurate indicator for determining the driver's braking demands. When the large force is applied and decreased to the brake pedal 92, pressure measured by the pressure sensor 232 is the more accurate indicator than the travel sensor 96 under this condition since the a large decrease in the braking force may be the result of the brake pedal 92 traveling only a small distance. As a result, the pressure measured by the pressure sensor 232 is used in cooperation with the travel sensor 96 for determining driver's braking demands under brake modulation such that boost pressure apply will be limited until a signal for the pressure sensor 232 confirms the travel sensor output. In all instances, boost pressure can limited to the wheel lock pressure since there is no added advantage in maintaining boost pressure higher than what is required for a wheel lock condition.

The travel sensor 96 may also be used to determine the flow rate of the supplied hydraulic brake fluid from the master cylinder 22. This flow rate can be used to estimate pressure upstream of the pedal dampening orifice 226 and the N/O base brake valve 230 in conjunction with the signal from the pressure sensor 232. This provides an indication of the expected flow rate for determining the closing force required when energizing the N/O base brake valve 230.

The N/C base brake valve 234 is a normally closed valve that redirects the flow of pressurized fluid from the pedal simulator 216 or from the boost valve 188 via a fluid circuit 236 to the reservoir 24 which is vented at atmospheric pressure for storing hydraulic brake fluid. The N/C base brake valve 234 permits the manual push through of hydraulic brake fluid to the rear brakes while preventing lost brake pedal travel to the pedal simulator 216. The N/C base brake valve 234 is an electrically actuated valve that is ported normally closed when in a de-energized position. Similar to N/O base brake valve 230, the N/C base brake valve 234 is current limited depending upon the hydraulic brake fluid flow rate for conserving energy. Under high flow rates, the N/C base brake valve 234 will be fully energized using a large current draw to prevent the flow forces of the pressurized hydraulic brake fluid returning from the boost valve 188 or pedal simulator 216 from closing the valve. In low flow conditions, the N/C base brake valve 234 will be energized using smaller current draws to maintain an open valve due to the low forces exerted on the N/C base brake valve 234.

Return hydraulic brake fluid flow from the dump valves 202, 206, 210 and 214 are directed back to the reservoir via a fluid circuit 178. The return of hydraulic brake fluid from the respective dump valves directly to the reservoir 24 (as opposed to the pedal simulator) has the advantage of reducing the pulsation feedback the driver may feel when secondary brake assist functions are used such as ABS. This allows the pressurized hydraulic brake fluid to flow back to reservoir 24 which is primarily unrestricted for the returning brake fluid. Another advantage of returning hydraulic brake fluid via the fluid circuit 178 is that this circuit actually draws the brake fluid from the dump valves 202, 206, 210, 214. Fluid circuit 178 in addition to being a return line to the reservoir 24 provides fluid to the pump 180 when the motor 182 and pump 180 are operating for supplying boost pressure or filling the HPA 184. If hydraulic brake fluid is released from the dump valves 202, 206, 210, 214 while the pump 180 is still operating, the pump 180 draws a vacuum on hydraulic brake fluid entering the pump 180. The vacuum created by the pump 180 draws hydraulic brake fluid from the dump valves 202, 206, 210, 214 at a faster rate than had the pump 180 not been operating.

Two return paths of pressurized brake fluid from both the boost valve 188 and pedal simulator 216 are provided by the braking system as shown in FIG. 1. Braking fluid is returned to the reservoir 24 via the fluid circuit 236 and brake fluid is also returned to the reservoir 24 via the fluid circuit 42 and the master cylinder 22. To return brake fluid to the reservoir 24 the primary chamber 108, brake fluid flows from the fluid circuit 42 and into the primary chamber 108. When the brake pedal 92 is at the rest position, a vent circuit 238 fluidically connects primary chamber 108 and a vent chamber 239. A fluid port 44 of the vent chamber 239 is in fluid communication with the fluid circuit 46. A filter (not shown) may be disposed in fluid circuit 46 to filter the brake fluid returning to the reservoir 24.

A spring loaded check valve 240 is connected between the output of the pump 180 (and HPA 184) and fluid circuit 178. This better limits the maximum pressure (i.e., limits above reservoir pressure). The spring loaded check valve 240 is connected in parallel a bleed valve 242. In the event the boost valve 188 becomes blocked or is inoperable while the pump 180 is active and the HPA 184 is exceeding a predetermined high pressure threshold, the spring loaded check valve 240 releases the highly pressurized brake fluid stored in the HPA 184. The spring loaded check valve 240 opens when the pressurized brake fluid stored in the HPA 184 has a pressure greater than the force of a check valve spring acting over the sealing area of the check valve. Such a condition may also occur when hydraulic brake fluid stored in the HPA 184 exceeds the predetermined high pressure threshold by driving a vehicle without braking. Elevated engine compartment temperatures could also increase the pressure of the hydraulic brake fluid in the HPA 184 thereby causing the overpressurized condition within HPA 184. The spring loaded check valve 240 is disposed relative to the pump 180 and apply valves 200, 204, 212, and 214 (when the boost valve is in the apply position) to relieve the HPA 184 of the overpressurized condition.

Prior to filling the braking system 20 with braking fluid at the assembly plant, solenoid valves are commonly required to be energized while air is evacuated from the conduits. The bleed valve 242 includes a spring activated piston for allowing the brake module 26 to be purged of entrapped gas. The bleed valve 242 is held in the open position by a spring for allowing the brake module 26 to be purged of air without having to energize any of the valves. Once the brake module 26 is purged of air and the braking system is activated, low pump fluid flow closes the bleed valve 242 and braking pressure applied by the pump 180 and HPA 184 maintains the bleed valve 242 in a closed position. When in a closed position, the brake fluid is prevented from bypassing the pump 180 via the bleed valve 242. When the pump 180 or HPA 184 provides no pressure or very low pressure, the bleed valve is opened and entrapped air is allowed to bypass the bleed valve via fluid circuit 244. When pressure is increased by the pump 180, the bleed valve 242 closes and brake fluid is prevented from flowing to the fluid circuit 178 via fluid circuit 244 and the bleed valve 242. In addition, the bleed valve 242 and the relief valve 240 may be integrated in a multifunction valve 246 (shown in FIG. 6).

Furthermore, a manual bleed screw 131 is coupled between fluid circuit 244 and fluid circuit 178 (in parallel with bleed valve 242). Should the HPA need to be depleted of pressurized fluid during a loss of electrical power, the HPA may be manually depleted by the manual bleed screw 131.

The pedal simulator 216 as discussed earlier exerts an opposing force on the fluid circuit 42 for providing a restorative force indirectly against the vehicle brake pedal 92 for simulating braking feedback in the brake pedal 92. Pedal simulators in general are sized for respective vehicles based on the requirements of the braking system. However, a modular pedal simulator may be utilized for all vehicle applications.

The following is a description of the operation of the braking system. During a typical braking condition for the braking system 20, a brake pedal 92 is depressed by the operator of the vehicle. The brake pedal 92 is coupled to a travel sensor 96 for producing a signal that is indicative of the length of travel of the brake pedal 92 and providing the signal to a control module (not shown). The control module receives various signals, processes signals, and controls the operation of various components of the brake system 20 in response to the received signals. Preferably, the control module communicates with a powertrain control module (not shown) and other additional braking controllers of the vehicle to provide coordinated braking during advanced braking control schemes (e.g., anti-lock braking (AB), traction control (TC), and vehicle stability control (VSC)). The control module provides a signal to the electric motor 182 correlating to the flow required to maintain a reserve of fluid in the HPA 184. The primary circuit 178 provides hydraulic braking fluid from the reservoir 24 to the pump 180 driven by the electric motor 182.

Pressurized brake fluid from the pump 180 is supplied to the HPA 184 in cooperation with the electrical actuated boost valve 188. The maximum pump output is sufficient to prevent depletion of the HPA 184 and is able to supply at least one apply to lock-up pressure should it be required. The boost valve 188 includes a control valve that is electrically positioned by the control module. It is desirable to control the boost valve 188 so that the control pressure of the boost valve 188 is proportional to an energizing electrical signal received from the control module. The boost valve 188 will position itself to permit the flow required to achieve the desired control pressure. This allows for variable flow of the hydraulic brake fluid as opposed to either a fully open port or a fully closed port.

As pressurized brake fluid flows into the HPA 184 through the fluid connection, the piston of the HPA 184 is moved to further compress the nitrogen gas precharge. Under this condition, the HPA 184 contains a reservoir of brake fluid which is pressurized by the piston under the influence of the compressed nitrogen gas, which may be used to assist in actuating the vehicle brakes 28*a*, *b*, *c*, and *d* whether or not the pump 180 is running.

When braking is required, the boost valve 188 is energized to allow the pressurized brake fluid provided by the HPA 184 and the pump 180 to actuate the vehicle brakes 28*a*, *b*, *c*, and *d* via the first brake fluid circuit 190. Apply valves 200 and 204 are ported in a de-energized position to allow pressurized brake fluid to be directed to the rear vehicle brakes 28*a* and 28*b* for brake actuation. Apply valves 208 and 212 are ported in a de-energized position to allow pressurized brake fluid to flow to a second intermediate chamber 150 and a third intermediate chamber 154, respectively. The pressurized hydraulic brake fluid entering the second and third intermediate chamber 150 and 154 exerts a force on a first secondary piston 126 and a second secondary piston 127, respectively. The exerted force on the first and second secondary piston 126 and 127 pressurizes the brake fluid in a first secondary chamber 158 and a second secondary chamber 162. The pressurized hydraulic brake fluid in the first secondary chamber 158 is in fluid communication with vehicle brake 28*c* for actuating vehicle brake 28*c* via the second brake fluid circuit 78. Similarly, the pressurized hydraulic brake fluid in the second secondary chamber 162 is in fluid communication with vehicle brake 28*d* for actuating vehicle brake 28*d* via the third circuit 236. The primary piston 94, the first secondary piston 126, and the second secondary piston 127 are functional during each brake apply. As a result, this eliminates "sleeping failures". A braking system having intermediate piston portions separate and distinct from the primary and secondary pistons (i.e., the first cylindrical portion is separate from the second secondary portion of each secondary piston) that are used only in manual push though operations could be inoperable and unnoticed (i.e., "a sleeping failure") because such intermediate piston portions may not be used during normal boost operation. The only time this may be first detected is when a driver is applying manual push through which may result in a brake failure on a respective circuit. The present invention overcomes this issue. In addition, having integrated secondary pistons reduces lost pedal travel during front wheel manual push through operation.

To provide pedal feedback to the driver during boost operation, the primary piston 94 forces hydraulic brake fluid out of a primary chamber 108 via the fluid circuit 42 to a pedal simulator 216 in response to the depressed brake pedal 92.

The dampening orifice 226 disposed between the primary chamber 108 and the pedal simulator 216 restricts the amount of hydraulic brake fluid that can flow through the dampening orifice 226. As the hydraulic brake fluid travels through the dampening orifice 226, an operator depressing the brake pedal 92 feels a resistance due to the restricted flow of hydraulic brake fluid within the dampening orifice 226. This restricted flow of hydraulic brake fluid causes a higher pressure in the primary chamber 108 than in the pedal simulator 216. Added resistance is further provided by the pedal simulator 216. As the hydraulic brake fluid is forced into a pedal simulator first chamber 218 from the fluid circuit 42, pressurized hydraulic brake fluid exerts a force on a simulator piston 220, which in turn, exerts a force and compresses a simulator spring 222. The restorative force exerted by the simulator spring 222 in cooperation with the dampening orifice 226 simulates the characteristics of a conventional boost system as felt by the driver at the brake pedal 92.

As the pressurized hydraulic brake fluid fills and expands the pedal simulator first chamber 218, hydraulic brake fluid stored in a pedal simulator second chamber 224 is forced out through the fluid circuit 252. The N/C base brake valve 234 when actuated allows pressurized hydraulic brake fluid to flow from the fluid circuit 252 to the fluid circuit 236. Fluid circuit 236 is fluidically connected to the reservoir 24 which is vented at atmospheric pressure for storing hydraulic brake fluid.

As the driver releases the brake pedal 92, the control module receives a signal from the travel sensor 96 identifying the driver's action to de-actuate the vehicle brakes 28a, b, c, and d. The control module provides a signal to de-energize the boost valve 188. When in the de-energized position, the flow of pressurized hydraulic brake fluid from the pump 180 and HPA 184 is restricted to the vehicle brakes 28a, b, c, and d. Furthermore, while in the de-energized position, the boost valve 188 is ported to relieve the pressurized hydraulic brake fluid in the fluid circuits that are actuating vehicle brakes 28a, b, c, and d. When de-energized, the boost valve 188 ports the first brake fluid circuit 190 to the fluid circuit 252 allowing the release of pressurized hydraulic brake fluid within fluid circuits 190.

Pressure is relieved in the second intermediate chamber 150 and the third intermediate chamber 154 of the master cylinder 22 in response to the porting of the boost valve 188 to the de-energized position. In response to the release of pressure in the second and third intermediate chambers 150 and 154, the first secondary piston spring 134 and the second secondary piston spring 146 exerts a force on the first secondary piston 126 and the second secondary piston 127. The first and second secondary pistons 126 and 127 are displaced in response to the restorative forces of the respective secondary piston springs 134 and 146, and as a result, hydraulic brake fluid within the second intermediate chamber 150 and third intermediate chamber 154 is forced out of each respective chamber. The hydraulic brake fluid within the second and third intermediate chambers 150 and 154 is directed to the fluid circuit 68 and fluid circuit 82, respectively. The hydraulic brake fluid in fluid circuits 68 and 82 is ported through dump valves 210 and 214, respectively, and thereafter to the fluid circuit 178 which is fluid communication with the reservoir 24.

During the driver's release of the brake pedal 92, the flow of hydraulic brake fluid from fluid circuits 190 and 252 flows into the pedal simulator second chamber 224. In cooperation with the flow of hydraulic fluid into the pedal simulator second chamber 224, the pedal simulator spring 222 exerts an opposing force of pressure against the pedal simulator piston 220, which in turn, acts on the pedal simulator first chamber 218. The hydraulic brake fluid within the pedal simulator first chamber 218 is forced to the primary chamber 108 of the master cylinder 22 via the fluid circuit 42. The primary piston spring 118 in cooperation with the return of brake fluid in the primary chamber 108 cooperatively returns the primary piston 94 to a no brake apply position when no force is exerted on the brake pedal 92.

During a brake release operation, high brake fluid flow rates into the pedal simulator second chamber 224 maybe present thereby causing the pedal simulator piston 220 to return to a no-brake apply position thereby emptying the brake fluid within the pedal simulator first chamber 218. Once the pedal simulator first chamber 218 is emptied and the piston has bottomed out against an inner wall of the pedal simulator 216, high brake fluid flow rates still entering the pedal simulator second chamber 224 may flow past the lip seal and into the pedal simulator first chamber 218 and thereby to circuit 42 for returning to the primary chamber 108. The high flow rates of brake fluid past the lip seal may cause the lip seal to flip and deform resulting permanent damage. To deter this condition from occurring, a return check flow path regulates the flow rates exiting the pedal simulator (and past the lip seal) to circuit 42.

Figure 4:
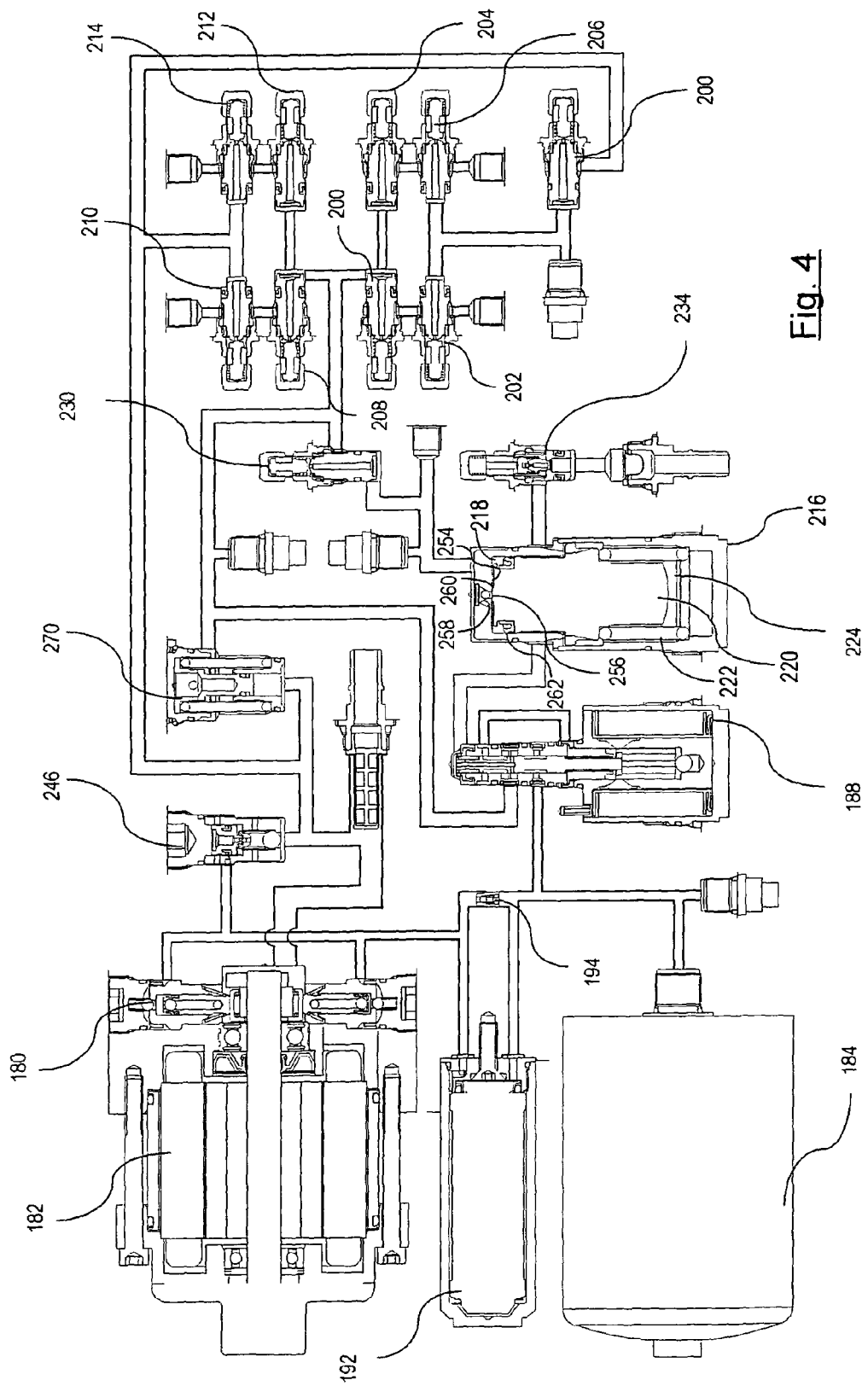
FIG. 4 is a circuit diagram of a braking module hydraulic control unit illustrating section views of components according to the first preferred embodiment of the present invention.

FIG. 4 illustrates a cross section of components of the brake module 26 including the pedal simulator 216. As discussed, brake fluid entering the pedal simulator second chamber 224 exerts a force on the pedal simulator piston 220 until the piston bottoms out against an inner wall 254. Typically, as brake fluid from the pedal simulator first chamber 218 is forced out to the fluid circuit 42, the brake fluid is allowed to exit through a port 258 and a port 256. Port 256 has a larger diameter portal than port 258 and allows the brake fluid to exit the pedal simulator first chamber 218 at high flow rates. As the pedal simulator piston 74 bottoms out against the inner wall 254, a stepped portion 260 of pedal simulator piston 220 is axially aligned with port 256. The stepped portion 260 having a slightly smaller diameter than the diameter of port 256 enters port 256 and blocks the flow of brake fluid through port 256. With port 256 blocked, brake fluid can only exit the pedal simulator first chamber 218 through port 258. The restricted flow of brake fluid through passage of port 258 decreases the flow rates exiting the pedal simulator first chamber 218 to the fluid circuit 42. As a result, the fluid flow rate flowing past a lip seal 262 and exiting the pedal simulator first chamber 218 via fluid circuit 258 to the fluid circuit 42 is low. The low fluid flow rates prevent deformation of the lip seal 262.

With respect to driver isolation, pedal pressure is never isolated from the driver when exerting a force or relieving pressure on the brake pedal 92 during normal boost braking operation. The pedal simulator spring 222 in cooperation with the dampening orifice 226 maintains a restorative force as hydraulic brake fluid in the primary chamber 108 is pressurized by the brake pedal 92 and enters the pedal simulator first chamber 218. When the brake pedal 92 is released, pressurized hydraulic brake fluid within each of the respective circuits used to actuate the respective vehicle brakes returns to the to the pedal simulator second chamber 224 and a restorative force (in cooperation with the pedal simulator spring 222) is applied to the brake pedal 92 as it is released. As a result, the pedal pressure from the respective hydraulic brake circuits exerted on the brake pedal 92 is maintained during normal braking conditions. For example, referring to FIG. 1, as the driver releases the brake pedal 92 from a current braking position, the primary piston 94 which is coupled to the brake pedal 92 displaces so as to relieve pressure in the primary chamber 108, which in turn, relieves pressure in the pedal simulator first chamber 218. In response to the release of pressure on the pedal simulator first chamber 218, the pedal simulator spring 222 exerts an opposing force on the simulator piston 220 to force hydraulic brake fluid from the pedal simulator first chamber 218 to primary chamber 108 via the fluid circuit 42. A check valve 228 is coupled in parallel to the dampening orifice 226 to allow the hydraulic brake fluid to flow to the primary chamber 108 at a faster rate than what the dampening orifice 226 would allow. The check valve 228 is ported to only allow hydraulic brake fluid to flow from the pedal simulator 216 to the primary chamber 108. An advantage of the brake system 20 is that in the event of a power loss during boost operation, pedal drop is avoided because the hydraulic brake fluid applied by the boost valve 188 returns to the primary chamber 108 via the pedal simulator 216 as opposed to being directed through the bypass valve 88 to the reservoir 24.

As discussed earlier, preferably the flux switching brushless motor 182 is used to drive the pump 180. In conventional electrical hydraulic braking systems, typically one or more pressure sensors are included downstream from a pump for determining pressure within a respective fluid circuit. The sensed pressure is monitored by the control module and provides feedback to a motor for controlling operation of the pump to maintain pressure of hydraulic brake fluid within a respective circuit. However, by integrating the flux switching brushless motor 182, the pressure sensors are eliminated in the brake module 26. The motor 182 self-monitors its output torque based on a correlation of current-to-torque and maintains a respective pressure within the fluid circuit 186 as directed by the control module based on a current-to-pressure correlation. The control module will monitor the travel sensor 96 to determine the braking demand input by the driver in cooperation with other sensors located throughout the vehicle that supply signal inputs to the control module to assist in determining the pump flow required to meet system demand and keep the HPA 184 sufficiently charged. Other sensor inputs received by the control module include wheel speed of each of the vehicle's wheels, vehicle deceleration, steering angle, vehicle yaw rate, vehicle speed, vehicle roll rate, and signals from radar, infrared, ultrasonic, or similar collision avoidance systems, cruise control systems (including AICC-Autonomous Intelligent Cruise Control Systems), and the like.

In the event of an electrical brake failure, the brake system 20 provides for manual braking. During an electrical failure, the motor 182 will cease to operate thereby failing to produce pressurized hydraulic brake fluid from the pump 180. Furthermore, the boost valve 188 returns to a de-energized position if energized. To provide manual braking, the driver exerts a high force on the brake pedal 92. The hydraulic brake fluid within the primary chamber 108 is pressurized and directed through the fluid circuit 42. Brake fluid passes through the N/O base brake valve 230 and through the apply valves 200 and 204 for applying braking fluid for actuating the rear vehicle brakes 28a and 28b. Manually pressurized brake fluid by the driver via the N/O base brake valve 230 passes through apply valves 208 and 212 to the first and second intermediate chambers 150 and 154. The pressure exerted in the respective intermediate chambers exerts a force on the first and second secondary pistons 126 and 127 for pressurizing braking fluid with the first and second secondary chambers 150 and 154 for actuating the front vehicle brakes 28c and 28d.

In the event a hydraulic failure occurs such as a leak within a fluid circuit (e.g., first brake fluid circuit 190) making the boost assist operation inoperable, a manual push through operation may be used to brake the front vehicle brakes 28c and 28d. Significant leakage of hydraulic brake fluid within a boost assist circuit of the brake module 26 (e.g., first brake fluid circuit 190) may lead to inadequate pressurization of the hydraulic brake fluid during normal boost conditions. In such an event, the rear vehicle brakes 28a and 28b will be inoperable. To provide a back-up fail-safe condition for stopping the vehicle under such conditions, the driver of the vehicle may manually push through each respective piston of the master cylinder 22 for actuating front vehicle brakes 28a and 28b.

Since front vehicle brake 28c and 28d operates on a separate circuit 78 and 90, respectively, one of the front vehicle brakes will continue to be operable should the other become inoperable. In conventional braking systems, for a respective force exerted on a brake pedal, the pressure exerted on the vehicle brakes will be proportional to the exerted force on the brake pedal. If a brake circuit becomes inoperable in a conventional system, an incremental amount of force exerted on the brake pedal is required to generate an incremental amount of pressure on the vehicle brakes for compensating for the lost circuit. In the present invention, if a loss of a one of the brake circuit occurs, a same braking force (i.e., used to brake four vehicle brakes) will produce a higher pressure on the operable brakes. For example, if a leak occurs in the first brake fluid circuit 190 which results in the loss of the rear brakes 28a and 28b, a same braking force exerted on the brake pedal used to brake vehicle brakes 28a-d will produce a higher pressure exerted on vehicle brakes 28c and 28d. As a result, the master cylinder 22 compensates for the loss of the brake circuit so that a same braking force exerted on the brake pedal will generate a higher pressure on the operable front brakes. In addition, past braking systems are known to incorporate a bypass valve in parallel with the N/O base brake valve 230 to allow manual braking in the event of non-functional N/O base brake valve 230; however, elimination of such a relief valve allows the driver of the vehicle to generate higher pressures in the master cylinder 22 with respect to 4-wheel push through for a given pedal force. Since the bypass valve is eliminated, higher pressures generated in the master cylinder 22 by the driver are not alleviated. Rather, the driver may generate higher pressures in the master cylinder 22 in the absence of such a relief valve and such pressure is used to apply higher manual braking pressure to the vehicle wheels.

Detecting whether a leak is present in the hydraulic braking system is typically determined by the level of brake fluid in the reservoir 24. A fluid level switch 264 adapted to the reservoir 24 is utilized for determining whether a low level brake fluid condition is present. If the fluid level switch 264 indicates that the brake fluid is low, a warning is provided to the operator of the vehicle indicating that the braking system should be checked for service. However, if an operator senses a normal brake pedal feedback for a respective brake actuation, the operator might ignore the warning indicator not realizing the severity of the present condition.

In conventional braking systems, a direct pressure applied to the brake pedal exerts a force on one or more pistons within the master cylinder which forces hydraulic brake fluid through brake circuits to a plurality of vehicle brakes. A resistive force of the hydraulic brake fluid in the braking circuits provides direct pedal feedback in the conventional braking system. During a condition where a leak is present in a conventional braking system, in addition to the warning light requiring service, an operator may feel a non-typical feedback resistance from the brake pedal (e.g., spongy brakes) thereby raising the operators awareness that the braking system requires servicing. However, in the braking system of the present invention, the pedal simulator may not apply a same resistance feedback from the brake pedal as that of the convention braking system. The restorative force applied against the brake pedal 92 in the present invention is the result of the primary piston 94 within the master cylinder 22 pressurizing hydraulic brake fluid against the simulator piston 220, which in turn, exerts a force and compresses a simulator spring 222. The pressure feedback as applied by the pedal simulator 216 is based on what the expected pressure should be for a respective pedal displacement as sensed by the travel sensor 96 in cooperation with other pressure sensors in comparison to a direct pressure feedback of the conventional braking system. As a result, the pedal simulator 216 may not provide the same resistive braking force feedback as that of a conventional braking system. A driver may acknowledge the warning light but if the resistance force of the brake pedal 92 feels normal to the operator, the operator may assume that immediate servicing is not necessary.

To better assist the operator in determining that a brake failure is occurring which requires immediate attention, a secondary warning (such as service braking system immediately) is preferably provided to the operator. Additional sensors could be added to the braking system to detect the leak, however additional sensors are costly and may not be feasible to implement in the present invention. For example, a pressure differential switch may be disposed between both fluid circuits of the front vehicle brakes. A large pressure differential between the two brake circuits would signify that a leak is occurring in one of the brake circuits. However, since the pressure differential switch would need to be disposed between a respective proportion valve (or isolation valve) and a respective vehicle brake, the pressure differential switch would be subject to rapid pressure differences generated when the braking system is applying anti-lock braking. Such pressure differences could result in false warnings.

To determine whether a hydraulic brake fluid leak is present in the system without adding additional sensors to the system, a determination can be made based on a predetermined amount of flow rate provided to the braking system during a braking condition. In a preferred embodiment, illustrated in FIG. 1), the motor 182 is a flux switching brushless is used to drive the pump 180. The motor 182 self-monitors its speed. Based on the operating speed of the motor 180, a determination can be made as to the flow rate of the hydraulic brake fluid as output by the pump 180. A correlation is made based on the flowrate of the hydraulic brake fluid output by the pump 180 as determined by the speed of the motor 182 and the amount of hydraulic brake fluid used by the braking circuit 178 (e.g., amount of brake fluid discharged by the reservoir 24). A ratio greater than a predetermined threshold given the respective braking condition (e.g., high pressure braking or low pressure braking as detected by the travel sensor 96) determines whether a leak is present in the braking system. Alternatively, a conventional motor (e.g., motor with brushes) may be utilized. The flow rate of hydraulic brake fluid as output by the pump 180 is determined by the current draw of the conventional motor 182. In a yet another preferred embodiment (not illustrated), the flow rate of hydraulic fluid flowing to the boost valve 188 may be determined by how often the high pressure accumulator 184 is recharged.

Any significant leakage within a respective fluid circuit of the vehicle braking system 20 will result in a loss of hydraulic brake fluid pressure within the primary chamber 108 of the master cylinder 22 as the primary piston 94 attempts to compress the hydraulic brake fluid. Both the hydraulic boost function and the manual braking function will fail to pressurize the braking system due to the significant leakage. To apply manual push through for braking the front vehicle brakes 28c and 28d, the driver exerts a longer travel on the brake pedal 92. The longer travel displaces the primary piston 94 beyond the range used during normal boost operation. The abutment surface 116 of the primary piston 94 contacts and displace the end portions 120 and 136 of the first and second secondary piston 126 and 127, respectively. As the first and second secondary pistons 126 and 127 are displaced, brake fluid within the first and second secondary chambers 158 and 162 is pressurized, thereby exerting a force for actuating the front vehicle brakes 28c and 28d.

In the event leakage occurs in the one of the secondary chambers, resulting in loss of hydraulic fluid in a respective secondary chamber, one of the front vehicle brakes 28c or 28d may be used for braking since both front vehicle brakes 28c and 28d are independently actuatable. Manual braking will be available for the rear vehicle brakes 28a and 28b and for the respective front vehicle brake 28c or 28d that maintains its hydraulic brake fluid circuit integrity.

Various secondary braking strategies may be executed or cooperatively executed by the brake system 20 such as regenerative braking systems, anti-lock braking systems (ABS), traction control, coordinated vehicle stability control, hill hold, automated collision avoidance, or automated cruise control. Thus, it may be desired to actuate one or more of the vehicle brakes 28a, b, c, and d for these purposes even when the vehicle driver is not depressing the brake pedal 92. Similarly, it may be desired to temporarily decrease the braking force of one or more of the vehicle brakes 28a, b, c, and d, individually or in cooperation, such as for the purposes of antilock braking even if the operator is depressing the brake pedal 92.

FIG. 1 further illustrates a vehicle having independent front and rear axle brake control requirements to apply different pressures to the rear and front axles 29 and 31 of the vehicle. This can be accomplished by reducing the pressure applied to one axle relative to the other axle. Pressure reduction for a respective vehicle axle requires that both vehicle brakes on the respective axle have braking force applied at a substantially same pressure. Applying a substantially even braking force for a respective set of brakes of a respective axle requires that a same amount of flow rate of pressurized brake fluid is applied to each respective brake assuming that external factors are consistent between each respective wheel such as brake stiffness and pad friction.

Regenerative braking is typically applied to one of the respective axles of a vehicle for energy recapture by simultaneously reducing pressure while exerting an electromagnetic resistive force to the axle. During periods of braking when regenerative braking is applied to a respective axle for maximum recapture of energy, brake blending occurs so that the regenerative braking being applied to the respective axle does not create a torque imbalance between each axle of the vehicle. Too much wheel torque in a respective region of the vehicle leads to a wheel slip condition. As a result, a balance is maintained between recapture energy and balanced braking. Brake balance becomes more complex under conditions when a respective slip control is applied such as anti-lock braking. Under such conditions, each respective vehicle brake of the non-regenerative braking axle is controlled by a respective apply valve and a respective dump valve for supplying, maintaining, or relieving pressure from the respective brake. The respective valves are two-position valves (i.e., fully opened or fully closed). Due to the pulsing of the respective valves during anti-lock braking, different flow rates may be generated within each vehicle brake circuit, and as a result, an unbalanced braking force may be applied to each respective wheel for the respective axle.

To apply a balance flow rate of pressurized brake fluid within a set of respective vehicle brakes of the rear axle 29, the apply valves 200 and 204 are preferably proportional valves. In addition, a proportional valve 266 is connected to a fluid circuit 268 between the dump valves 202 and 206 and the fluid circuit 178. The proportional valve 266 is disposed prior to the joint coupling of a fluid circuit 268 and the fluid circuit 178.

To apply a balanced flow rate of brake fluid to the respective set of brakes 24a and 24b on the rear axle, the proportional valves 200 and 204 are adjusted to variably control the amount of pressurized brake fluid to the vehicle brakes 28a and 28b, respectively. The dump valves 202 and 206 are held open continuously during balanced proportional pressure control. Each of the dump valves 202 and 206 are pulse width modulated when the release flow rates predict low differential pressures to reduce heating of their respective coils while maintaining them in the open hydraulic position. The dump valves 202 and 206, while in a closed position, maintain brake pressure so that pressurized brake fluid from the boost valve 188 may be applied to the vehicle brakes 28a and 28b. The dump valves 202 and 206, when in the open position, allow brake fluid to be relieved from the respective vehicle brake 28a or 28b. An unbalanced pressure in each vehicle brake 28a and 28b is often desirable during periods of anti-lock braking (or other slip control). To balance the brake pressures on the rear axle, a proportional valve 266 is provided downstream of the dump valves 202 and 206 in the fluid circuit 268. Since the proportional valve 266 is disposed prior to the joint coupling of the fluid circuit 268 and the fluid circuit 178. The flow rate from dump valves 210 and 214 in fluid communication with the circuit 178 remains unaffected.

The proportional valve 266 controls the flow rate and the volume of pressurized brake fluid exiting the dump valves 202 and 206. The proportional valve 266 is variably adjusted to allow a gradual change in the flow rate of pressurized brake fluid as opposed to an abrupt opening and closing the valve. Furthermore, because the flow rate of pressurized brake fluid exiting the vehicle brakes 28a and 28b is controlled by the dump valves 202 and 206 at high braking pressures, the proportional valve 266 may be of relatively smaller size. This is due to the proportional valve 266 functioning primarily at low brake pressures even though it is sized with sufficient open area to not restrict flow downstream of both of the dump valves 202 and 206.

Alternatively, the dump valves 202 and 206 may include proportional valves for variably controlling the flow rate of pressurized brake fluid leaving the vehicle brakes 28d and 28c without incorporating the proportional valve 266, however, this would add additional cost since a separate normally closed proportional valve design would be required and either a separate pressure balance solenoid valve or an extra pressure transducer would need to be added.

In addition to utilizing the proportional valve 266 to variably control the flow rate of pressurized brake fluid leaving the vehicle brakes, a compliance accumulator 270 is ported between the first brake fluid circuit 190 and the fluid circuit 178. The appliance accumulator 270 is a spring loaded two chamber device which prevents the mixing of pressurized brake fluid between the first brake fluid circuit 190 and the fluid circuit 178. During ABS braking actuation, pressure of brake fluid within the first brake fluid circuit 190 constantly changes due to the actuation and de-actuation of the apply valves 200, 204, 200, and 212. Pressure fluctuations are generated within the first brake fluid circuit 190 by the constant actuation of the apply valves 200, 204, 200, and 212. The compliance accumulator 270 functions as a dampening device to alleviate such pressure fluctuations. The compliance accumulator 270 accumulates pressurized brake fluid within a chamber of the compliance accumulator 270 when the brake fluid pressure within the first brake fluid circuit 190 is above a spring force of the compliance accumulator 270 and discharges pressurized brake fluid to the first brake fluid circuit 190 when the brake fluid pressure within the compliance accumulator 270 is greater than that in the first brake fluid circuit 190. As a result, the compliance accumulator 270 may regulate incremental pressure changes within the first brake fluid circuit 190 without having to constantly change the flow rate and pressure of hydraulic brake fluid via the boost valve 188.

FIG. 1 further illustrates a braking system for purging entrapped gas within the master cylinder 22. Typically, the chambers of a master cylinder do not require hydro-mechanical or solenoid valves for venting to the reservoir for purging entrapped gas because a vent to the reservoir is provided at the master cylinder chamber. A master cylinder mounted in a vehicle is typically positioned at a higher elevation than a brake module so that the entrapped gas does not naturally flow from the master cylinder to the brake module. However, if the master cylinder and the brake module are mounted in close proximity to one another, gas can flow down to the brake module, and then back up to the master cylinder reservoir via a separate return path. For braking systems where the brake module and the master cylinder are mounted a far distance apart, purging the entrapped gas from the master cylinder to the reservoir via the brake module is more difficult.

In this embodiment, to purge entrapped gas when the brake module 26 is mounted a far distance from the master cylinder 22, a bleed valve 272 is fluidically connected between the second intermediate chamber 150 via a fluid circuit 274 and a third intermediate chamber 154 via a fluid circuit 276: The bleed valve 272 is also fluidically connected to the first intermediate chamber 115. The bleed valve 272 includes a first bleed valve seal 277 disposed circumferentially around the bleed valve piston 284. A first bleed valve chamber 278 is in fluid communication with the first intermediate chamber 115. The first bleed valve chamber 278 is formed between a valve body 281, the bleed valve piston 284 and the first seal 277 of the bleed valve 272.

A second bleed valve seal 283 is disposed circumferentially around the bleed valve piston 284. A second bleed valve chamber 288 is in fluid communication with the second intermediate chamber 150. The second bleed valve chamber 288 is formed between the valve body 281, the bleed valve piston 278, the first seal valve seal 277, and the second bleed valve seal 283.

A third bleed valve seal 285 is disposed circumferentially around the bleed valve piston 284. A third bleed valve chamber 286 is in fluid communication with the third intermediate chamber 154, the third bleed valve chamber 286 is disposed between the valve body 281, the bleed valve piston 284, the second bleed valve seal 283 and the third bleed valve seal 285. The second bleed valve seal 283 provides a unidirectional flow of brake fluid from the third bleed valve chamber 286 to the second bleed valve chamber 288.

A fourth bleed valve chamber 290 is in fluid communication with the third intermediate chamber 154. The fourth bleed valve chamber 290 is formed between the valve body 281, the bleed valve piston 284 and the third bleed valve seal 285.

When a vehicle is in a non-braking condition, the fluid circuits of the brake module 26 as well as any other secondary braking module have little or no fluid flow and are maintained at low pressures (aside from the fluid circuit 186 between the pump 180, HPA 184, and the boost valve 188 which maintains high pressure within the HPA 184). During a non-braking condition, the brake pedal 92 is at a rest position and no braking force is exerted on the primary piston 94 as well as the first and secondary pistons 126 and 127 of the master cylinder 22. As a result, pressurized brake fluid within each of the chambers within the master cylinder 22 remains unpressurized. The hydraulic brake fluid within the first intermediate chamber 115 while in an unpressurized state is in equilibrium with the hydraulic brake fluid of a first bleed valve chamber 278 of the bleed valve 272 via a fluid circuit 280. While in the equilibrium, a spring 282 in the bleed valve 272 is maintained in a preloaded state (i.e., preloaded as when inserted within the bleed valve). While in the preloaded state, the spring 282 maintains a force on a bleed valve piston 284 disposed in a valve body 285 which shuttles the bleed valve piston 284 to an opposing end of the bleed valve 272. When the bleed valve piston 284 is shuttled to the opposing end, the bleed valve piston 284 ports the bleed valve 272 to an open position. There is no resistance force exerted against the bleed valve piston 284 and the spring 282 from the opposing side of the bleed valve piston 284, since there is no hydraulic boost pressure being applied by the boost valve 188 during a non-braking condition.

To purge entrapped gas within the master cylinder 22, the boost valve 188 is variably opened to allow a very low flow rate of pressurized hydraulic brake fluid to flow to the third intermediate chamber 154 of the master cylinder 22: N/O base brake valve 230 is energized closed during the bleed mode to allow the low flow rate of pressurized hydraulic brake fluid to flow to the third intermediate chamber 154 of the master cylinder 22 only. Despite the hydraulic brake fluid being highly pressurized in the HPA 184, the boost valve 188 is partially opened so that only a low flow of pressurized hydraulic brake fluid is allowed to flow through the boost valve 188 via the fluid circuits 190 and 82 to the third intermediate chamber 154. The low flow rate results in a low pressure increase (e.g., 1 Bar) of hydraulic brake fluid within the fluid circuits 190 and 82.

The flow of low pressurized hydraulic brake fluid enters the third intermediate chamber 154 of the master cylinder 22 via the fluid circuit 82 and exits the third intermediate chamber 154 via the fluid conduit 276. With the bleed valve 272 ported to the open position, the low pressurized brake fluid enters a third bleed valve chamber 286 via the fluid circuit 276. Lip seals within the bleed valve 272 control the directional flow of hydraulic brake fluid within the bleed valve 272 from the third bleed valve chamber 286 to a second bleed valve chamber 288. The hydraulic brake fluid exits the bleed valve 272 from the second bleed valve chamber 288 and flows through the fluid circuit 274, and to the second intermediate chamber 154 of the master cylinder 22. The hydraulic fluid flow exits the second intermediate chamber 154 and flow through the fluid circuits 94 and 36 to the reservoir 24. The apply valve 208 is ported closed and the dump valve 210 is ported open to allow the flow of hydraulic brake fluid to the reservoir 24. As the flow of low pressurized hydraulic brake fluid enters and exits the second and third intermediate chamber 150 and 62, the entrapped gas is forced out of the second and third intermediate chamber 150 and 62 and transported via the brake module 26 to the reservoir 24 where the entrapped gas is purged to the reservoir 24.

This purging of the entrapped gas from the master cylinder 22 may be initiated on a periodic basis by having the control module (not shown) periodically open the boost valve 188 (i.e., under non-braking conditions) to produce a low pressure fluid flow rate within the respective fluid circuits 190, 68, 82. If hydraulic boost braking is required at any time, the boost valve 188 increases the flow rate of pressurized hydraulic fluid to the master cylinder 22 for providing electro-hydraulic assisted braking. The increased pressure exerted from the boost valve 188 provides pressurized hydraulic brake fluid via the fluid circuit 276 to a fourth bleed valve chamber 290 to shuttle the piston 284 to a closed ported position to prevent the flow of pressurized brake fluid through the bleed valve 272. The bleed valve 272 includes lip seals 291 and 293 which prevent the flow of hydraulic brake fluid within the bleed valve 272 to flow in both directions. Rather, hydraulic braking fluid flow is allowed to flow in only one direction when ported open (i.e., from the third bleed valve chamber 286 to the second bleed valve chamber 288). Flow from the second bleed valve chamber 288 to the third bleed valve chamber 286 past the lip seals 291 and 293 is blocked.

Figure 5:
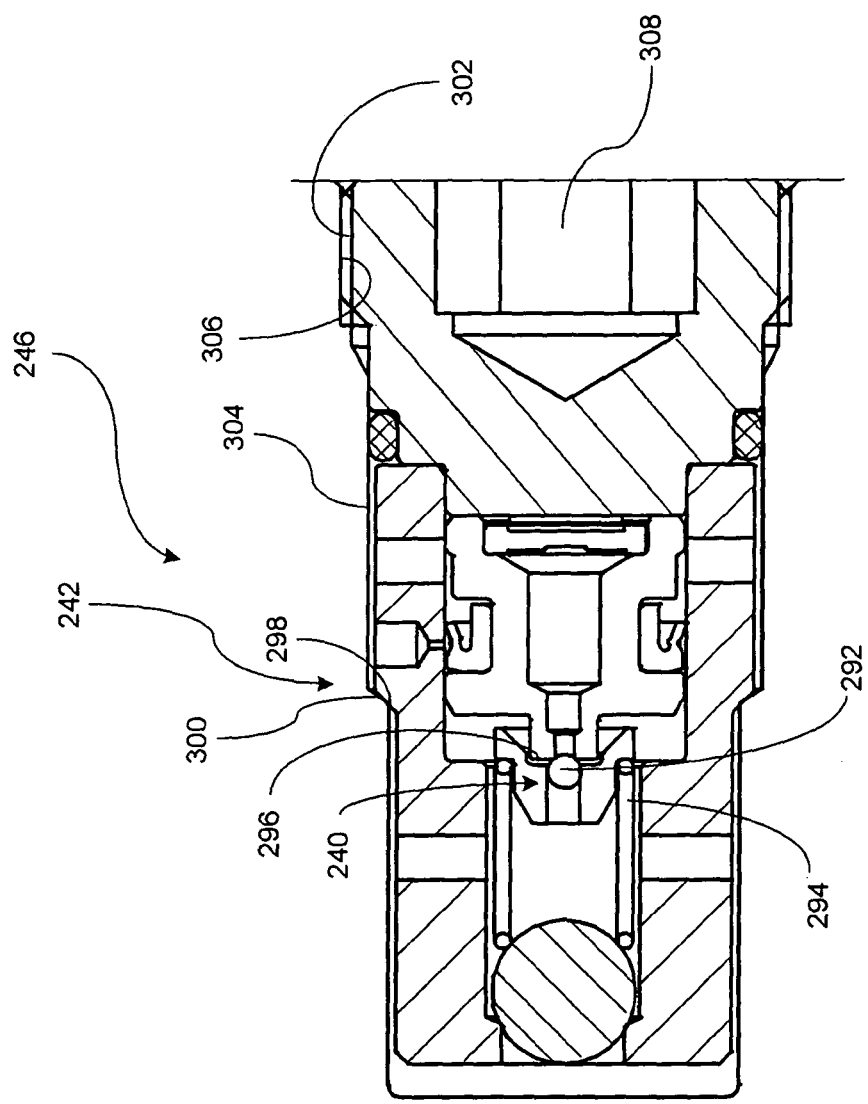
FIG. 5 is a cross section of a multifunction valve according to the first preferred embodiment of the present invention.

FIG. 5 illustrates a cross section of the multifunction valve 246. Although a majority of the valves discussed in the hydraulic schematic in FIG. 1 are shown separate and distinct, the multifunction valve 246 integrates and performs multiple functions of a plurality of valves. The multifunction valve 246 includes the spring loaded check valve 240 (i.e., emergency relief valve) for relieving overpressurized brake fluid stored in the HPA 184 and the bleed valve 242 for manually relieving pressure in the HPA 184 in the event of an electrical failure, and for evacuating air during system fill, or servicing. The spring loaded check valve is shown at 182 within the multifunction valve 246. A ball 292 is seated within a retainer and is biased by a spring 294. When the brake fluid pressure exerted on the ball 292 is greater than the force applied by the spring 294, the ball 292 unseats for allowing brake fluid to flow through a chamber 296 and to the fluid circuit 178.

To manually relieve pressure from the HPA 184, the bleed valve 242 of the multifunction valve 246 includes an abutment portion 298 that creates a flow passage with an inner wall section 300 of the multifunction valve 246 when in an open position. The multifunction valve 246 includes an inner valve body 302 that is threaded. A mating wall section 304 of a valve housing 306 is also threaded for engaging with the inner valve body 302. A socket portion 308 allows the inner valve body 302 to be rotated clockwise or counterclockwise. As the inner valve body 302 is rotated in a respective direction, the abutment portion 298 moves away from the inner wall section 300 for opening the flow passage. Brake fluid is allowed to flow through this flow passage for bleeding the HPA 184 or draining the brake circuit. In addition, brake fluid may be added to the brake system 20 for adding brake fluid to the brake module 26 with brake fluid and bleeding out entrapped air. When the inner valve body 302 is rotated in an opposite direction, the abutment surface 187 sealingly contacts the inner wall section 300 thereby closing the flow passage.

Figure 6:
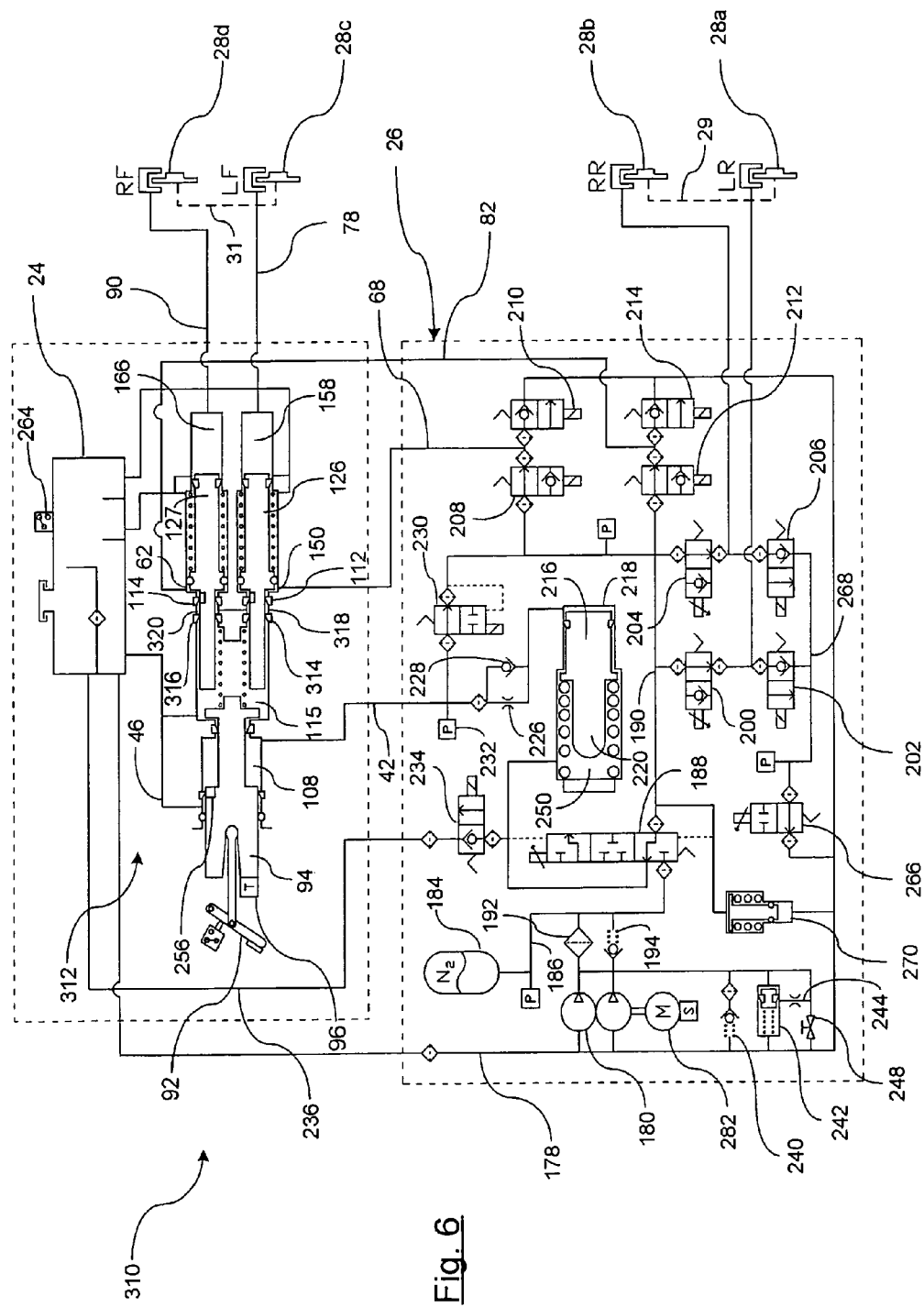
FIG. 6 is a schematic of a braking system according to a second preferred embodiment of the present invention.

FIG. 6 illustrates a second embodiment of a vehicle brake system, indicated generally at 310, in accordance with the invention for applying active hydraulic boost in a braking system. Utilizing same reference numbers for same elements as shown in FIG. 1, the vehicle braking system 310 includes a master cylinder 312. The master cylinder 312 does not require the bleed valve 272, as used in FIG. 1, for bleeding entrapped air from the master cylinder 312. Rather the master cylinder 312 is ported for bleeding air from the second intermediate chamber 150 and the third intermediate chamber 154, as will be described below.

Figure 7:
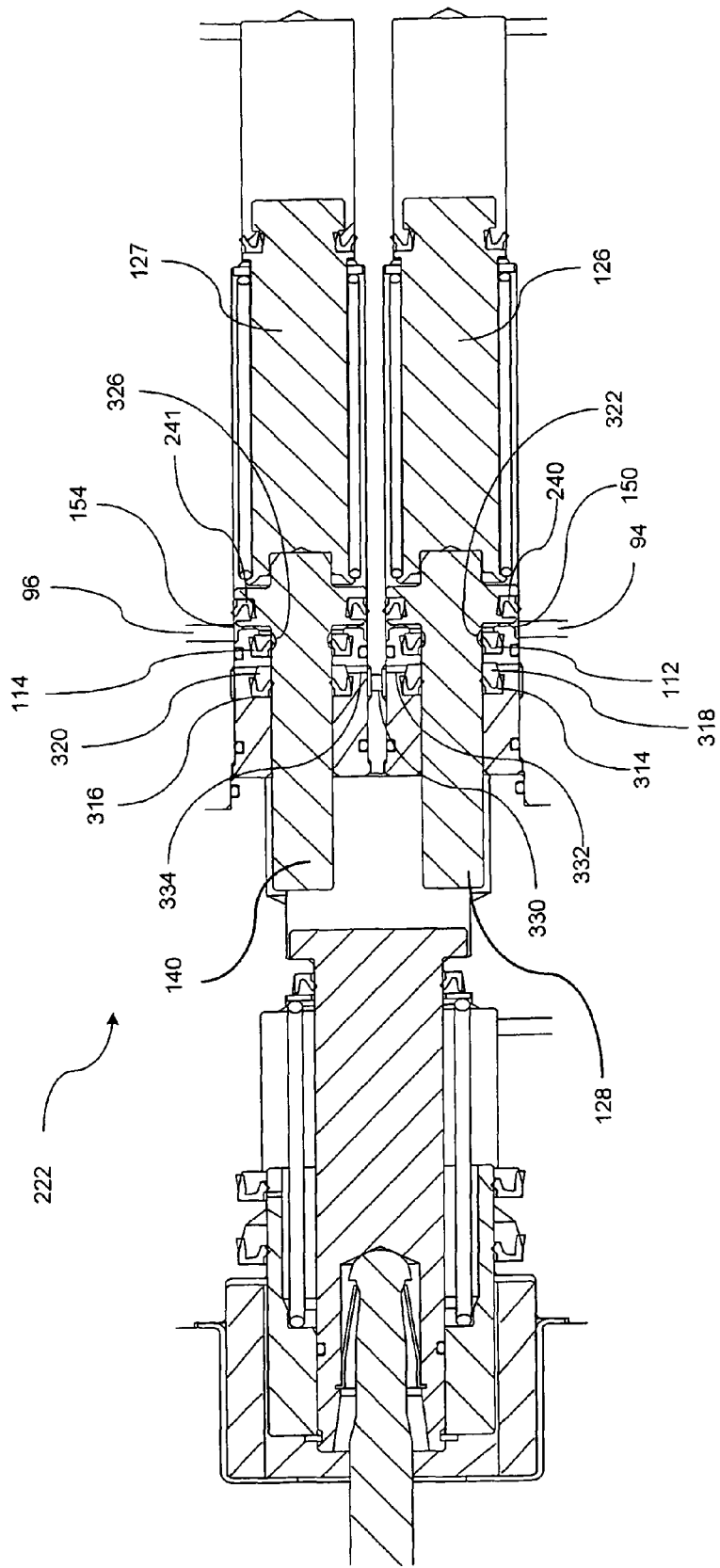
FIG. 7 is a cross section view of a master cylinder according to the second preferred embodiment of the present invention.

FIG. 7 illustrates an enlarged cross section of the master cylinder 312. The master cylinder 312 is similar to the master cylinder 22 as shown in FIG. 1 with the addition of a ninth seal 314 and a tenth seal 316. A first bleed chamber 318 is formed between the ninth seal 314 and the lip seal 112. The first bleed chamber 318 is an annular chamber disposed around a section of the first cylindrical portion 128 of the first secondary piston 126. A second bleed chamber 320 is formed between the tenth seal 316 and the lip seal 114. The second bleed chamber 320 is an annular chamber disposed around a section of the first cylindrical portion 144 of the second secondary piston 127.

A first flow passage 322 is a circumferential indentation that is formed in the surface of the first secondary piston 126. When the lip seal 112 is axially aligned with the first flow passage 322, brake fluid is allowed to flow around the lip seal 112 between the second intermediate chamber 150 and the first bleed chamber 318. Similarly, a second flow passage 326 is a circumferential indentation that is formed in the surface of the second secondary piston 127. When the lip seal 114 is axially aligned with the second flow passage 326, brake fluid is allowed to flow around the lip seal 114 between the third intermediate chamber 154 and the second bleed chamber 320.

A fluid passage 330 is provided in the master cylinder 312 to allow brake fluid to flow between the first bleed chamber 318 and the second bleed chamber 320 during non-braking conditions.

During a non-braking condition, the fluid circuits of the brake module 26 as well as any other secondary braking module have little or no fluid flow and are maintained at low pressures (aside from the fluid circuit between the pump 180, the HPA 184, and the boost valve 188 which maintains high pressure within the HPA 184). The brake pedal 92 is at a rest position and no braking force is exerted on the primary piston 94 or the secondary pistons of the master cylinder 312. Brake fluid within each of the chambers within the master cylinder 312 remains unpressurized. When the master cylinder 312 is at a rest, non-braking position, the first flow passage 322 is axially aligned over the lip seal 112 for allowing brake fluid to flow around the lip seal 112 from the second intermediate chamber 150 and the first bleed chamber 318. Similarly, the second flow passage 326 is axially aligned over the lip seal 114 for allowing brake fluid to flow around the lip seal 114 between the third intermediate chamber 154 and the second bleed chamber 320. Furthermore, a first portal 332 in fluidic communication with the first bleed chamber 318 is also in fluidic communication with the fluid passage 330. Similarly, a second portal 334 in fluid communication with the second bleed chamber 320 is also in fluidic communication with the fluid passage 330. As a result, the hydraulic brake fluid within the first bleed chamber 318 (and the second intermediate chamber 150) is in equilibrium with the hydraulic brake fluid of the second bleed chamber 320 (and the third intermediate chamber 154).

Referring to both FIGS. 6 and 7, to purge entrapped air from the second intermediate chamber 150 and the third intermediate chamber 154 of the master cylinder 312, the boost valve 188 is variably opened. The apply valve 208 is opened and the dump valve 210 is ported closed to allow a very low flow rate of pressurized hydraulic brake fluid to flow to the second intermediate chamber 150 of the master cylinder 312. The N/O base brake valve 230 is energized closed during the bleed mode to allow the low flow rate of hydraulic brake fluid to flow to the second intermediate chamber 150 of the master cylinder 312 only. Despite the hydraulic brake fluid being highly pressurized in the HPA 184, the boost valve 188 is only partially opened so that only a low flow of pressurized hydraulic brake fluid is allowed to flow through the boost valve 188 via the first brake fluid circuit 190 and the fluid circuit 68 to the second intermediate chamber 150. The low flow rate results in a low pressure increase (e.g., 1 Bar) of hydraulic brake fluid within the first brake fluid circuit 190 and the fluid circuit 68.

From the second intermediate chamber 150 of the master cylinder 312, the low pressure hydraulic brake fluid flows around the lip seal 112 via the first flow passage 322 to the first bleed chamber 318. The hydraulic brake fluid then exits the first bleed chamber 318 via the portal 332. Hydraulic brake fluid flows through the flow passage 330 and into the second bleed chamber 320 via portal 334. The hydraulic brake fluid is then forced around the lip seal 114 via the second flow passage 326 and into the third intermediate chamber 154. The hydraulic brake fluid and entrapped air are then forced out of the third intermediate chamber 154 via the fluid circuit 82. The apply valve 212 is closed and the dump valve 214 is opened to allow the flow of hydraulic brake fluid to the reservoir 24 via the fluid circuit 178. As the flow of low pressurized hydraulic brake fluid enters and exits the second and third intermediate chamber 150 and 154, respectively, any entrapped gas is forced out of these chambers and transported via the brake module 26 to the reservoir 24 where the entrapped gas is purged to the reservoir 24 and vented to atmosphere.

Alternatively, the apply valve 208 and the dump valve 214 may be closed and the apply valve 212 and the dump valve 210 may be opened for purging entrapped air from the third intermediate chamber 154 to the second intermediate chamber 150.

This purging of the entrapped gas from the master cylinder 312 may be initiated on a periodic basis by having the control module (not shown) periodically open the boost valve 188 (i.e., under non-braking conditions) to produce a low pressure fluid flow rate within the respective fluid circuits 190, 68 and 82. If hydraulic boost braking is required at any time, the boost valve 188 increases the flow rate of pressurized hydraulic fluid to the master cylinder 312 for providing electro-hydraulic assisted braking. The increased pressure exerted from the boost valve 188 provides pressurized hydraulic brake fluid to the intermediate chambers 150 and 154 for braking the front vehicle brakes 28c and 28d. The movement of the secondary pistons 126 and 127 results in the flow passages 322 and 326 moving past the lip seals 112 and 114, respectively, so that the flow passages 225 and 226 and the lip seals 112 and 114 are no longer axially aligned. Hydraulic brake fluid is therefore prevented from flowing around the lips seals 112 and 114 and to the first bleed chamber 318 and the second bleed chamber 320. As a result, the master cylinder 312 operatively brakes the vehicle and different pressure levels can be applied to the two front brakes 28c and 28d during slip control operation.

Figure 8:
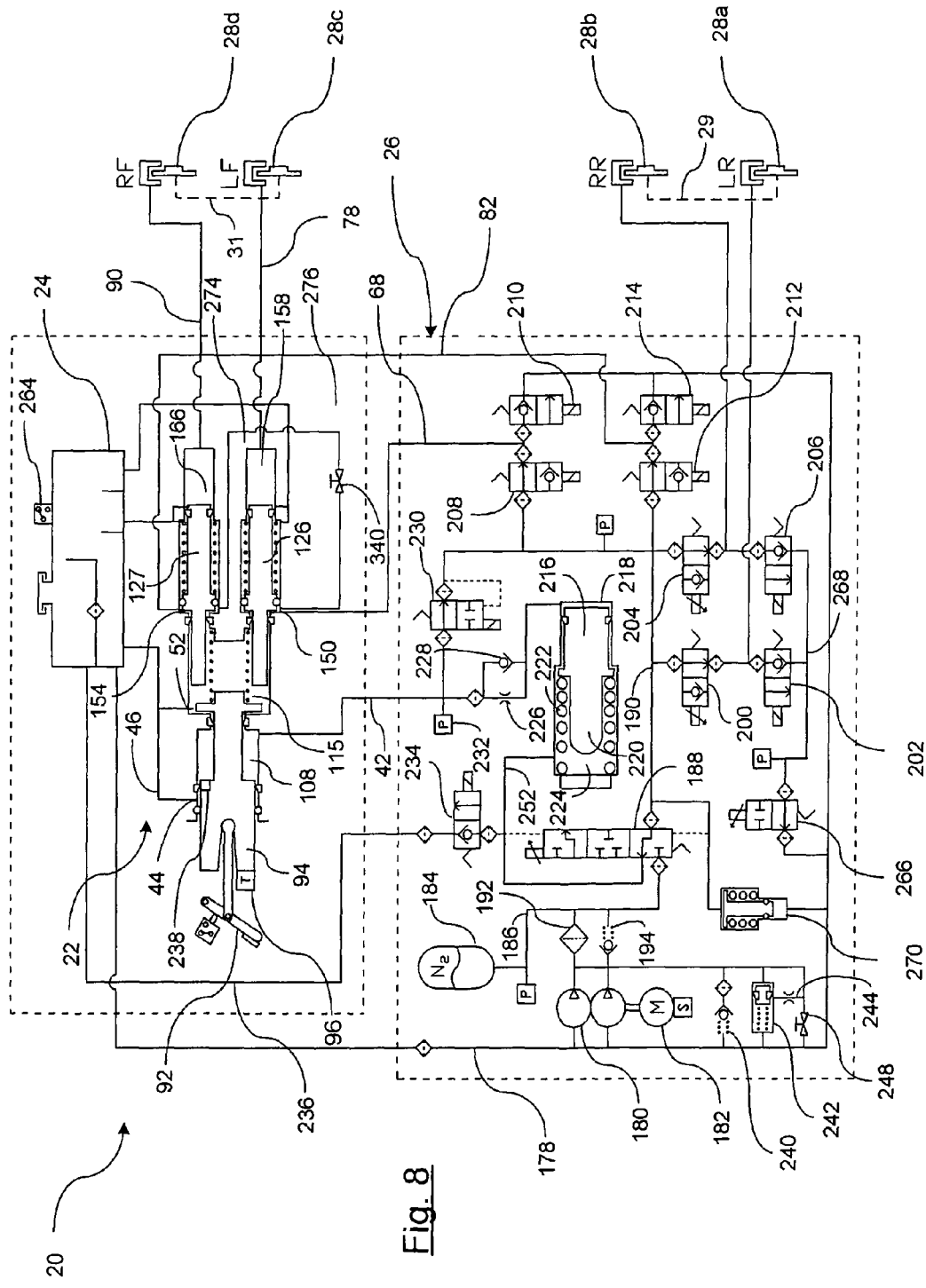
FIG. 8 is a schematic of a braking system according to a third preferred embodiment of the present invention.

FIG. 8 illustrates a third embodiment of a vehicle brake system indicated generally at 336, in accordance with the present invention for applying active hydraulic boost in a braking system. Utilizing same reference numbers for same elements as shown in FIG. 1, the vehicle braking system 336 includes a master cylinder 338. The master cylinder 338 does not require the bleed valve 272, as used in FIG. 1, for bleeding entrapped air from the master cylinder 338. Rather a manual bleed screw 340 is coupled between the fluid circuits 68 and 82 for use as a manually actuated valve for bleeding hydraulic brake fluid and entrapped air from the intermediate chambers 150 and 154 of the master cylinder 338 (apply and dump valves are still required to be actuated as discussed earlier during bleeding operation).

Figure 9:
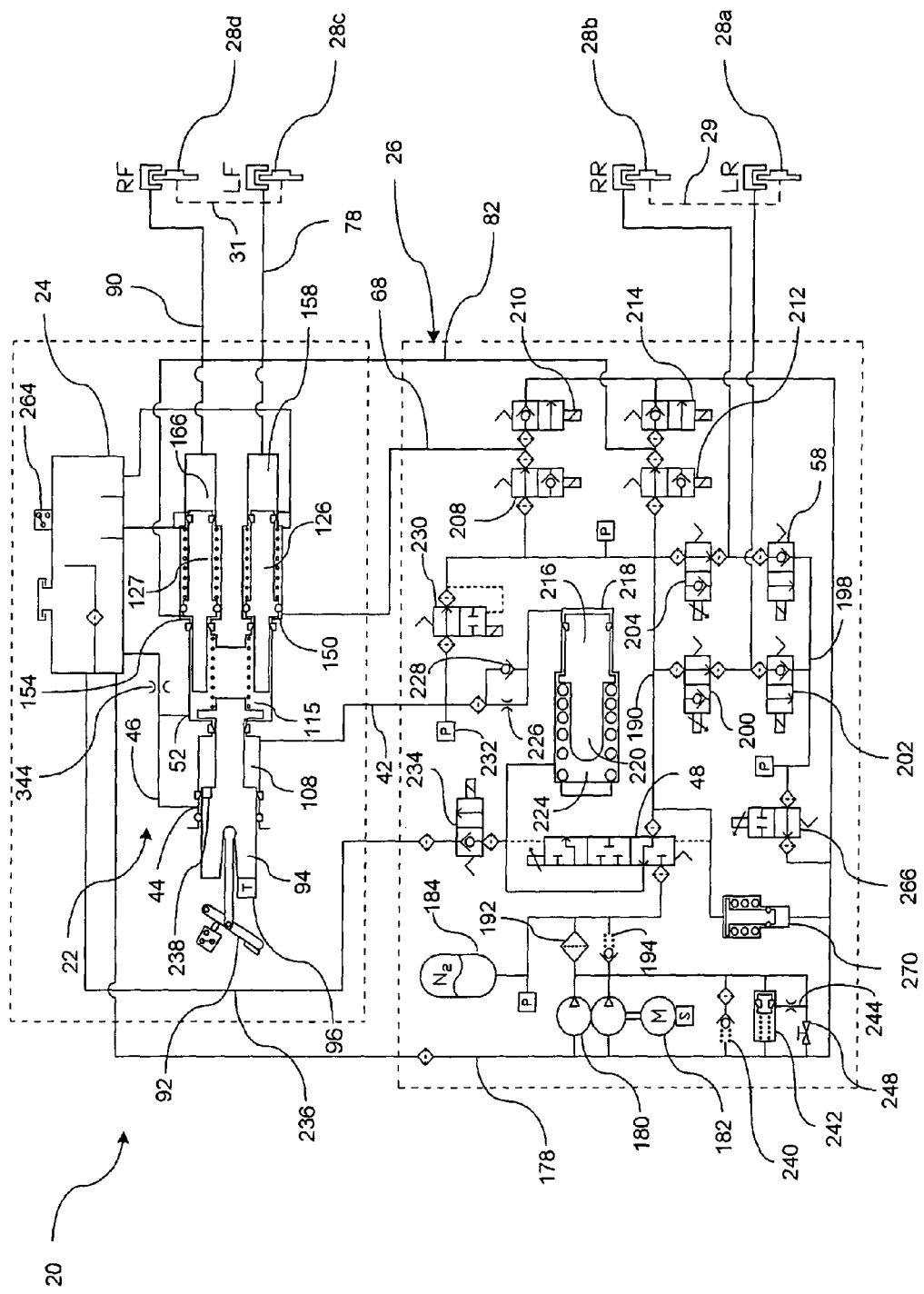
FIG. 9 is a schematic of a braking system according to a fourth preferred embodiment of the present invention.

FIG. 9 illustrates a fourth preferred embodiment for purging entrapped gas within master cylinder. The master cylinder 22 is the same as shown in FIGS. 1 and 2. To purge entrapped gas when the brake module 26 is mounted a far distance from the master cylinder 22, a restriction orifice 344 is disposed in the fluid circuit 46 for restricting the flow of brake fluid returning to the reservoir 24 through ports 44 and 52 and directing flow back to the master cylinder 22 for purging entrapped gas.

When a vehicle is in a non-braking condition, the fluid circuits of the brake module 26 as well as any other secondary braking module have little or no fluid flow and are maintained at low pressures (aside from the fluid circuit 244 between the pump 180, the HPA 184, and the boost valve 188 which maintains high pressure within the HPA 184). During a non-braking condition, the brake pedal 92 is at a rest position and no braking force is exerted on the primary piston 94 as well as the intermediate and secondary pistons of the master cylinder 22.

To purge entrapped gas within the master cylinder 22, the boost valve 188 is variably opened to allow a very low flow rate of pressurized hydraulic brake fluid to flow though the boost valve 188 to the first brake fluid circuit 190. The low flow rate results in a low pressure increase (e.g., 1 Bar) of hydraulic brake fluid within the first brake fluid circuit 190. Fluid flows though the normally open M/C isolation valve 230 to the fluid circuit 42. Brake fluid from the fluid circuit 42 enters the primary chamber 108 and flows through the vent circuit 238 and the out port 44. The brake fluid is partially restricted from flowing back to the reservoir 24 by the restriction orifice 344. The restriction of fluid flow by the restriction orifice 344 forces a portion of the brake fluid to flow through the port 52 and into the first intermediate chamber 115. The brake fluid flows past the lip seals 112 and 114 and into the second and third intermediate chamber 150 and 154, respectively. The brake fluid is then force out the ports 66 and 80 to the fluid circuits 68 and 82 respectively. The Isolation valves 208 and 212 are ported closed and the dump valves 210 and 214 are ported open to allow the flow of hydraulic brake fluid to the reservoir 24. As the flow of low pressurized hydraulic brake fluid enters and exits the second and third intermediate chamber 150 and 154, the entrapped gas is forced out of these chambers, including the second and third intermediate chambers 150 and 154, the primary chamber 108, and the first intermediate chamber 115. The entrapped gas is transported via the fluid circuit 178 to the reservoir 24 where the entrapped gas is purged in the reservoir 24.

This purging of the entrapped gas from the master cylinder 22 may be performed on a periodic basis by having the control module (not shown) periodically open the boost valve 188 (i.e., under non-braking conditions) to produce a low pressure fluid flow rate within the respective fluid circuits 190, 68, and 82. If hydraulic boost braking is required at any time, the boost valve 188 increases the flow rate of pressurized hydraulic fluid to the master cylinder 22 for providing electro-hydraulic assisted braking. The N/O base brake valve 230 is closed resulting in no flow to the master cylinder 22 via the fluid circuit 42.

Figure 10:
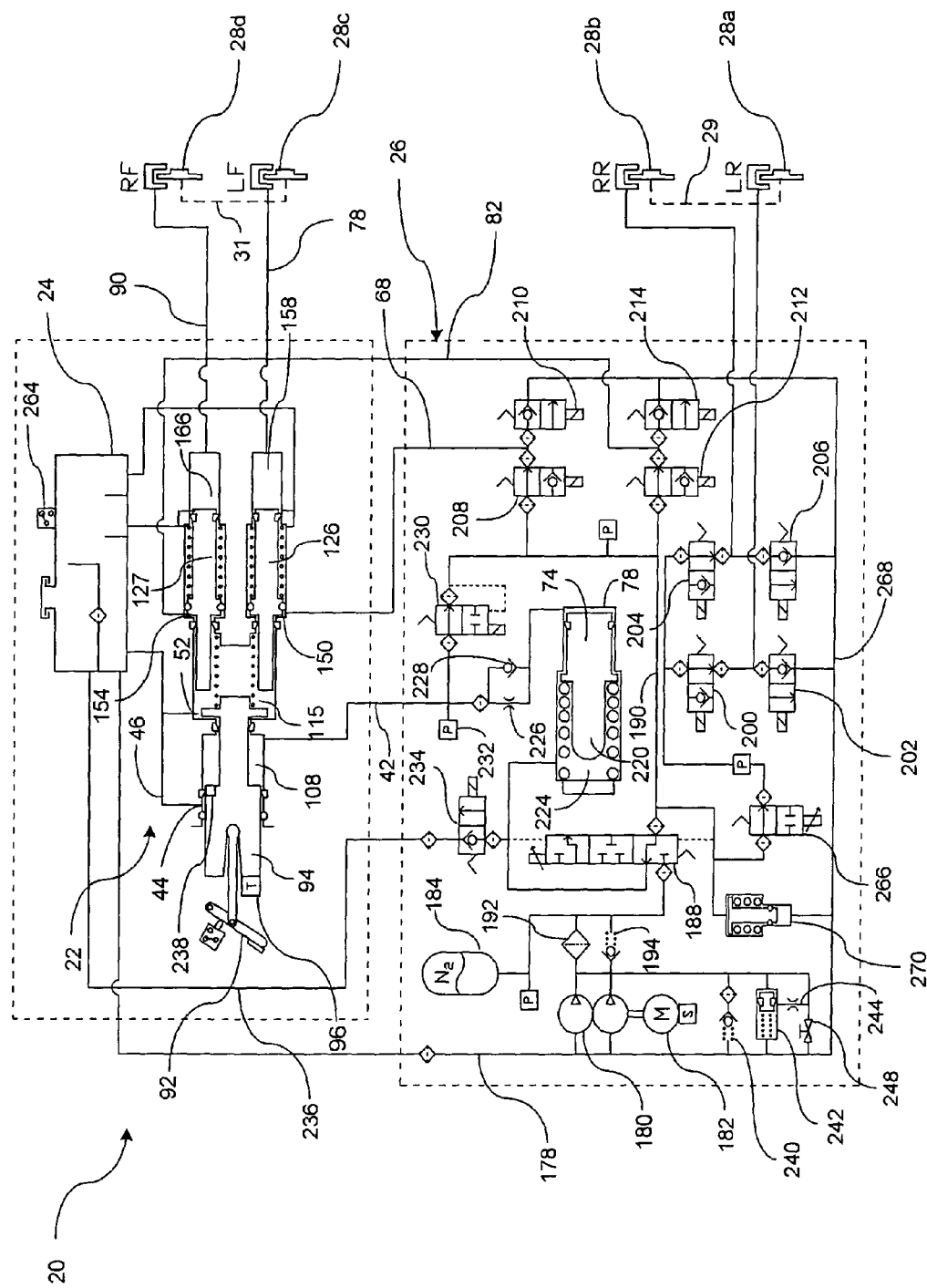
FIG. 10 is a schematic of a braking system according to a fifth preferred embodiment of the present invention.

FIG. 10 illustrates a brake system according to a fifth preferred embodiment of the present invention. The proportional valve 266 is disposed between the boost valve 188 and an apply valve 346 and an apply valve 348 as opposed to being disposed downstream of dump valves 202 and 206 as shown in FIG. 1. An issue with having the proportional valve positioned as shown in FIG. 1 is that proportional valve must operate digitally with fast response and variably with precision. By the disposing proportional valve 266 upstream of the apply valves 346 and 348, the apply valves 346 and 348 operate as isolation valves (i.e., digital valves) as opposed to being proportional valves. Furthermore, the proportional valve 266 disposed upstream of the apply valve 346 and 348 operates only proportionally, not digitally. This simplifies the axle proportional reduction controls by reducing the number of valves that must be energized to accomplish brake blending functionality. Only the proportional valve 266 requires variable control (as opposed to the apply valves 200 and 204 of FIG. 1).

Figure 11:
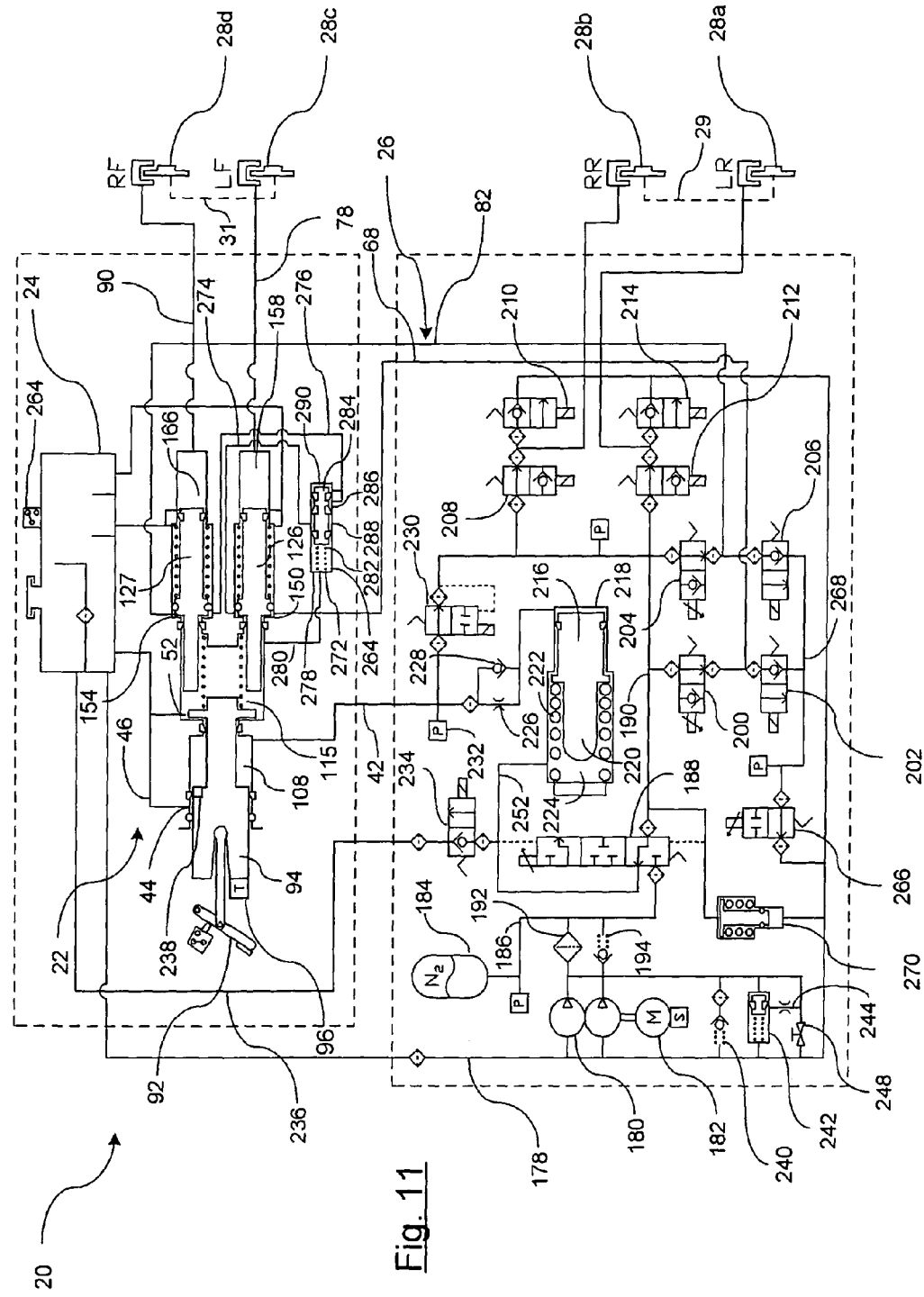
FIG. 11 is a schematic of a braking system according to a sixth preferred embodiment of the present invention.

FIG. 11 illustrates a sixth preferred embodiment according to the present invention. Similar to the braking circuit shown in FIG. 1 for rear axle proportional control, the same circuit can be used for front axle proportional pressure reduction control by simple external re-plumbing. The rear brakes 28a and 28b would be connected to the ports between the valves 208 and 210, and between the valves 212 and 214, respectively. The ports between the valves 200 and 202, and between the valves 204 and 206 would be connected to the master cylinder chambers corresponding to the front brakes 28c and 28d, respectively.

Figure 12:
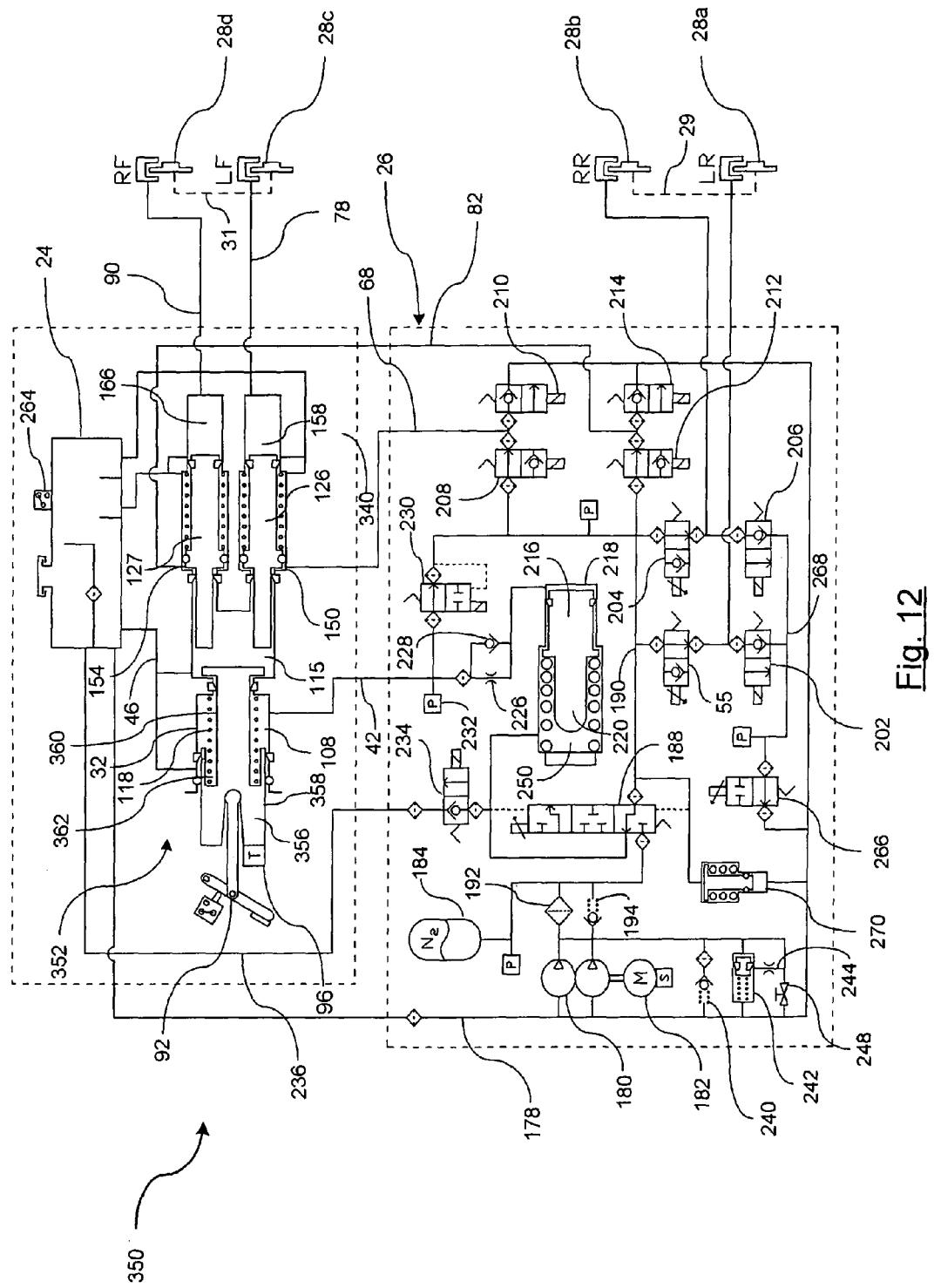
FIG. 12 is a schematic of a braking system according to a seventh preferred embodiment of the present invention.

FIG. 12 illustrates a seventh preferred embodiment according to the present invention. A braking system, shown generally at 350, includes a master cylinder 352. A primary piston spring 354 is disposed in the primary chamber 108 around a primary piston 356. The primary piston 356 includes a first cylindrical portion 358 that steps down to a second cylindrical portion 360. An annular recess 362 is formed in a stepped surface between the first cylindrical portion 358 and the second cylindrical portion 360 for receiving a portion of the primary piston spring 354. The primary piston spring 354 is disposed around the outer surface of the second cylindrical portion 360 extending axially along the second cylindrical portion 360 and abuts an opposing wall surface of the primary housing portion 32. Packaging the primary piston spring 354 around the second cylindrical portion 360 as opposed to packaging it within the first intermediate chamber between the abutment surface of the primary piston and the abutment surface of the abutment member (shown in FIG. 2) allows the first intermediate chamber 115 to be diametrically smaller. In addition, the primary piston spring 354 is packaged within the primary chamber 108 in unused space. As a result, the master cylinder 350 is shorter in length in comparison to the master cylinder as shown in FIG. 1. Furthermore, due to the packaging of the primary spring 354 around the exterior surface of the primary piston 356, the assembly of internal subcomponents of the master cylinder 350 is simplified.

In summary the invention provides a master cylinder includes a housing and a first secondary piston disposed in the housing. The first secondary piston cooperates with the housing to define a first secondary chamber which changes volume as the first secondary piston moves in the housing. A second secondary piston is disposed in the housing and cooperates with the housing to define a second secondary chamber which changes volume as the second secondary piston moves in the housing. A stepped primary piston is disposed in the housing. The primary piston cooperates with the housing to define a primary chamber which changes volume as the primary piston moves in the housing. The primary piston defines an abutment surface which can be driven into abutment with the first secondary piston and the second secondary piston to move the first secondary piston and the second secondary piston. A primary piston spring maintains a restorative force on the primary piston when actuated.

In yet another aspect of the present invention, a braking system is provided for applying pressurized hydraulic brake fluid to a plurality of vehicle brakes. The brake system includes a source of brake fluid and a primary brake fluid circuit. A pump provides hydraulic brake fluid from the source of brake fluid to the primary brake fluid circuit. An electric motor drives the pump. A high pressure accumulator stores pressurized hydraulic brake fluid from the primary circuit. A first brake fluid circuit is provided. A boost valve controls a flow of pressurized brake fluid from the primary brake fluid circuit to the first brake fluid circuit. A first brake is actuated by brake fluid from the first brake fluid circuit. A second brake is operated by an application of pressurized brake fluid from the first brake fluid circuit. A second brake circuit is provided. A third brake is actuated by pressurized brake fluid from the second circuit. A third circuit brake fluid circuit is provided. A fourth brake is actuated by pressurized brake fluid from the third circuit. A brake pedal receives and input braking demand from a driver and provided the braking demands to a master cylinder fluidically coupled to the first brake circuit, second brake circuit, and third brake circuit.

In yet another aspect of the present invention, a braking system is provided for applying pressurized hydraulic brake fluid to a plurality of vehicle brakes. The brake system includes a source of brake fluid and a primary brake fluid circuit. A pump provides hydraulic brake fluid from the source of brake fluid to the primary brake fluid circuit. An electric motor drives the pump. A high pressure accumulator stores pressurized hydraulic brake fluid from the primary circuit. A first brake fluid circuit is provided. A boost valve controls a flow of pressurized brake fluid from the primary brake fluid circuit to the first brake fluid circuit. A first brake is actuated by brake fluid from the first brake fluid circuit. A second brake is operated by an application of pressurized brake fluid from the first brake fluid circuit. A second brake circuit is provided. A third brake is actuated by pressurized brake fluid from the second circuit. A third circuit brake fluid circuit is provided. A fourth brake is actuated by pressurized brake fluid from the third circuit. A brake pedal receives and input braking demand from a driver. A master cylinder includes a housing and a first secondary piston disposed in the housing. The first secondary piston cooperates with the housing to define a first secondary chamber which changes volume as the first secondary piston moves in the housing. A second secondary piston is disposed in the housing and cooperates with the housing to define a second secondary chamber which changes volume as the second secondary piston moves in the housing. A stepped primary piston is disposed in the housing. The primary piston cooperates with the housing to define a primary chamber which changes volume as the primary piston moves in the housing. The primary piston defines an abutment surface which can be driven into abutment with the first secondary piston and the second secondary piston to move the first secondary piston and the second secondary piston. A primary piston spring maintains a restorative force on the primary piston when actuated In yet another aspect of the present invention, a braking system is provided for applying pressurized hydraulic brake fluid to a plurality of vehicle brakes. The brake system includes a source of brake fluid and a primary brake fluid circuit. A pump provides hydraulic brake fluid from the source of brake fluid to the primary brake fluid circuit. An electric motor drives the pump. A high pressure accumulator stores pressurized hydraulic brake fluid from the primary circuit. A first brake fluid circuit is provided. A boost valve controls a flow of pressurized brake fluid from the primary brake fluid circuit to the first brake fluid circuit. A first brake is actuated by brake fluid from the first brake fluid circuit. A second brake is operated by an application of pressurized brake fluid from the first brake fluid circuit. A second brake circuit is provided. A third brake is actuated by pressurized brake fluid from the second circuit. A third circuit brake fluid circuit is provided. A fourth brake is actuated by pressurized brake fluid from the third circuit. A brake pedal receives and input braking demand from a driver. A master cylinder for receiving the input demands from the brake pedal. The master cylinder includes a housing. A first secondary piston is disposed in the housing. The first secondary piston cooperates with the housing to define a first secondary chamber which changes volume as the first secondary piston moves in the housing. The first secondary chamber is in fluid communication with the second brake fluid circuit for acting on the third brake. A first secondary piston spring disposed in the fourth bore and circumferentially disposed around the first secondary piston for maintaining a restorative force on the first secondary piston when actuated. A second secondary piston is disposed in the housing and cooperates with the housing to define a second secondary chamber which changes volume as the second secondary piston moves in the housing. The second secondary chamber is in fluid communication with the third brake fluid circuit acting on the fourth vehicle brake. A second secondary piston spring is disposed in the sixth bore and is circumferentially disposed around the second secondary piston for maintaining a restorative force on the second secondary piston when actuated. The first secondary piston and the second secondary piston are each capable of being each independently operably displaced by an application of pressurized fluid from the first brake fluid circuit to pressurize brake fluid in, respectively, the second brake fluid circuit to operate the third brake actuator and the third brake fluid circuit to operate the fourth brake actuator. A stepped primary piston is disposed in the housing. The primary piston cooperates with the housing to define a primary chamber which changes volume as the primary piston moves in the housing. The primary piston defines an abutment surface which can be driven into abutment with the first secondary piston and the second secondary piston to move the first secondary piston and the second secondary piston. A primary piston spring maintains a restorative force on the primary piston when actuated.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE NUMERALS a vehicle brake system 20
a master cylinder 22
a reservoir 24
a brake module 26
a first vehicle brake 28*a*
a second vehicle brake 28*b*
a third vehicle brake 28*c*
a fourth vehicle brake 28*d*
a rear axle 29
a master cylinder housing 30
a front axle 31
a primary housing portion 32
a first end 34
an open ended first cylindrical bore 36
a second cylindrical bore 38
a first port 40
a fluid circuit 42
a second port 44
a fluid circuit 46
an intermediate housing portion 48
a third cylindrical bore 50
a third port 52
a first secondary housing portion 54
a second secondary housing portion 56
a fourth cylindrical bore 58
a fifth cylindrical bore 60.
a sixth cylindrical bore 62
a seventh cylindrical bore 64.
a fourth port 66
a fluid circuit 68
a fifth port 70
a sixth port 72
a fluid circuit 74
a seventh port 76
a second brake fluid circuit 78
an eighth port 80
a fluid circuit 82
a ninth port 84
a tenth port 85
a fluid circuit 86
an eleventh port 88
a third brake fluid circuit 90

A brake pedal 92
a primary piston 94
an input rod 95
a travel sensor 96
a first cylindrical portion 98
a primary seal 100
a first seal 102
a second cylindrical portion 104
a second seal 106
a primary chamber 108
a third cylindrical portion 110
a third seal 112
a fourth seal 114
a first intermediate chamber 115
an abutment surface 116
a primary piston spring 118
an abutment surface 120
an abutment member 122
a first end 124
a first secondary piston 126
a second secondary piston 127
a first cylindrical portion 128
a second cylindrical portion 130
a third cylindrical portion 132
a first secondary piston spring 134
a first end 136
a first cylindrical portion 140
a second cylindrical portion 142
a third cylindrical portion 144
a second secondary piston spring 146
a fifth seal 148
a second intermediate chamber 150
a sixth seal 152
a third intermediate chamber 154
a seventh seal 156
a first secondary chamber 158
an eighth seal 160
a second secondary chamber 162
a primary circuit 178
a pump 180
an electric motor 182
a high pressure accumulator (HPA) 184
a fluid circuit 186
an electro-hydraulic pilot operated boost valve 188
a first brake fluid circuit 190
a filter 192
an apply valve 200
a dump valve 202
an apply valve 204
a dump valve 206
an apply valve 208
a dump valve 210
an apply valve 212
a dump valve 214
a pedal simulator 216
a first chamber 218
a pedal simulator piston 220
a pedal simulator spring 222
a second chamber 224
a dampening orifice 226
a check valve 228
a normally open (N/O) base brake valve 230
a pressure sensor 232
a normally closed (N/C) base brake valve 234
a fluid circuit 236
a vent circuit 238
a vent chamber 239
a spring loaded check valve 240
a bleed valve 242
a multifunction valve 246
a fluid circuit 252
an inner wall 254
a port 256
a port 258
a stepped portion 260
a lip seal 262
a fluid level switch 264
a proportional valve 266
a fluid circuit 268
a compliance accumulator 270
a bleed valve 272
a fluid circuit 274
fluid circuit 276
a first bleed valve seal 277
a first bleed valve chamber 278
to a fluid circuit 280
a valve body 281
a spring 282
a second bleed valve seal 283
a bleed valve piston 284
a third bleed valve seal 285
a third bleed valve chamber 286
a second bleed valve chamber 288
a fourth bleed valve chamber 290
a lip seal 291
a ball 292
a lip seal 293
a spring 294
a chamber 296
an abutment portion 298
an inner wall section 300
an inner valve body 302
a mating wall section 304
a valve housing 306
a socket portion 308
a vehicle brake system 310
a master cylinder 312
a seal 314
a lip seal 316
a first bleed chamber 318
a second bleed chamber 320
a first flow passage 322
a second flow passage 326
a fluid passage 330
a first portal 332
a second portal 334
a vehicle brake system 336
a manual bleed screw 340
a restriction orifice 344
an apply valve 346
an apply valve 348
a braking system 350
a master cylinder 352
a primary piston spring 354
a primary piston 356
a first cylindrical portion 358
a second cylindrical portion 360
an annular recess 362

What is claimed is:

1. A braking system for applying pressurized hydraulic brake fluid to a plurality of vehicle brakes comprising:
 a source of brake fluid;
 a primary brake fluid circuit;

a pump for providing hydraulic brake fluid from said source of brake fluid to said primary brake fluid circuit;

an electric motor for driving said pump;

a pressure accumulator for storing pressurized hydraulic brake fluid from said primary circuit;

a pedal simulator in fluid communication with said primary brake fluid circuit;

a first brake fluid circuit;

a boost valve for controlling a flow of pressurized brake fluid from said primary brake fluid circuit to said first brake fluid circuit;

a first brake actuated by brake fluid from said first brake fluid circuit;

a second brake operated by an application of pressurized brake fluid from said first brake fluid circuit;

a second brake fluid circuit that is hydraulically isolated from the first brake fluid circuit;

a third brake actuated by pressurized brake fluid from said second circuit;

a third circuit brake fluid circuit that is hydraulically isolated from the first and second brake fluid circuits;

a fourth brake actuated by pressurized brake fluid from said third circuit;

a brake pedal for receiving input braking demands from a driver;

a master cylinder for receiving said input demands from said brake pedal, said master cylinder comprising:

a housing;

a first secondary piston disposed in said housing said first secondary piston cooperating with said housing to define a first secondary chamber which changes volume as said first secondary piston moves in said housing, said first secondary chamber being in fluid communication with said second brake fluid circuit for acting on said third brake;

a second secondary piston disposed in said housing cooperating with said housing to define a second secondary chamber which changes volume as said second secondary piston moves in said housing, said second secondary chamber being in fluid communication with said third brake fluid circuit acting on said fourth vehicle brake;

said first secondary piston and said second secondary piston each capable during normal brake operation of being independently operably displaced by an application of pressurized fluid from said first brake fluid circuit to pressurize brake fluid in, respectively, said second brake fluid circuit to operate said third brake actuator and said third brake fluid circuit to operate said fourth brake actuator; and a primary piston disposed in said housing, said primary piston cooperating with said housing to define a primary chamber which changes volume as the primary piston moves in said housing, said primary piston defining an abutment surface which can be driven into abutment in a manual push-through mode with said first secondary piston and said second secondary piston to move said first secondary piston and said second secondary piston;

said primary chamber is in fluid communication with said pedal simulator during normal braking operation and is switched to communicate with said first and second brakes during said manual push-through operation.

* * * * *